United States Patent
Terras et al.

(10) Patent No.: US 10,108,530 B2
(45) Date of Patent: Oct. 23, 2018

(54) METHOD AND TOOL FOR GENERATING A PROGRAM CODE CONFIGURED TO PERFORM CONTROL FLOW CHECKING ON ANOTHER PROGRAM CODE CONTAINING INSTRUCTIONS FOR INDIRECT BRANCHING

(71) Applicant: STMICROELECTRONICS (ROUSSET) SAS, Rousset (FR)

(72) Inventors: Lydie Terras, Fuveau (FR); William Orlando, Peynier (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 0 days.

(21) Appl. No.: 15/270,323

(22) Filed: Sep. 20, 2016

(65) Prior Publication Data
US 2017/0242778 A1 Aug. 24, 2017

(30) Foreign Application Priority Data

Feb. 24, 2016 (FR) ..................................... 16 51507
Aug. 10, 2016 (EP) ..................................... 16183497

(51) Int. Cl.
*G06F 11/36* (2006.01)
*G06F 9/30* (2018.01)
(Continued)

(52) U.S. Cl.
CPC ...... *G06F 11/3644* (2013.01); *G06F 9/30058* (2013.01); *G06F 11/28* (2013.01);
(Continued)

(58) Field of Classification Search
CPC ...... G06F 9/3005; G06F 9/3802; G06F 21/64; G06F 11/3688; G06F 11/1004; G06F 9/30058; G06F 9/3867; G06F 9/3844; G06F 9/3806; G06F 9/30054; G06F 9/30181; G06F 9/3842; G06F 9/30043; G06F 9/3877; G06F 9/4887; G06F 8/427; G06F 8/4442;
(Continued)

(56) References Cited

U.S. PATENT DOCUMENTS 4,291,388 A * 9/1981 Ecker, Jr. ............. G05B 19/058
711/103
6,658,578 B1 * 12/2003 Laurenti ................... G06F 5/01
712/244

(Continued)

OTHER PUBLICATIONS

S. Bergaoui et al., IDSM: an Improved Disjoint Signature Monitoring Scheme for Processor Behavioral Checking, 2014 IEEE, [Retrieved on Oct. 5, 2017]. Retrieved from the internet: <URL: http://ieeexplore.ieee.org/stamp/stamp.jsp?arnumber=6841915> 6 Pages (1-6).*

(Continued)

*Primary Examiner* — Anibal Rivera
(74) *Attorney, Agent, or Firm* — Slater Matsil, LLP

(57) ABSTRACT

Synchronization points are inserted into a program code to be monitored, and are associated with different branches resulting from execution of an indirect branch instruction. The synchronization points can be accessed by the monitored program code for the purpose of identifying which branch to use during execution of the indirect branch instruction of the monitored program code.

32 Claims, 13 Drawing Sheets

(51) Int. Cl.
| | |
|---|---|
| *G06F 9/38* | (2018.01) |
| *G06F 21/64* | (2013.01) |
| *G06F 9/00* | (2006.01) |
| *G06F 21/52* | (2013.01) |
| *G06F 11/28* | (2006.01) |
| *G06F 21/44* | (2013.01) |
| *G06F 9/48* | (2006.01) |
| *G06F 11/10* | (2006.01) |

(52) U.S. Cl.
CPC .......... *G06F 11/3688* (2013.01); *G06F 21/44* (2013.01); *G06F 9/30043* (2013.01); *G06F 9/30181* (2013.01); *G06F 9/3844* (2013.01); *G06F 9/3867* (2013.01); *G06F 9/4887* (2013.01); *G06F 11/1004* (2013.01)

(58) Field of Classification Search
CPC ........ G06F 21/54; G06F 21/14; G06F 21/554; G06F 21/128; G06F 21/52; G06F 21/51; G06F 17/5045; G06F 9/3004
See application file for complete search history.

(56) References Cited

U.S. PATENT DOCUMENTS

| | | | | |
|---|---|---|---|---|
| 7,506,217 B2 * | 3/2009 | Bonin | .................. | G06F 11/1004 714/51 |
| 7,818,551 B2 * | 10/2010 | Joao | .................... | G06F 9/3844 712/233 |
| 9,135,414 B1 * | 9/2015 | Biffle | .................... | G06F 21/128 |
| 9,767,271 B2 * | 9/2017 | Ghose | .................... | G06F 21/51 |
| 9,858,411 B2 * | 1/2018 | Sahita | .................... | G06F 21/52 |
| 2005/0183072 A1 * | 8/2005 | Horning | .................. | G06F 21/14 717/140 |
| 2008/0307210 A1 * | 12/2008 | Levitan | ............... | G06F 9/30181 712/240 |
| 2010/0274972 A1 * | 10/2010 | Babayan | ............... | G06F 9/3842 711/125 |
| 2011/0167247 A1 * | 7/2011 | Gibbs | .................. | G06F 9/30054 712/240 |
| 2011/0167416 A1 * | 7/2011 | Sager | .................... | G06F 8/4442 717/149 |
| 2011/0289300 A1 * | 11/2011 | Beaumont-Smith | ........................ | G06F 9/3806 712/205 |
| 2012/0317350 A1 * | 12/2012 | Driever | .................... | G06F 13/12 711/104 |
| 2013/0125097 A1 * | 5/2013 | Ebcioglu | ............. | G06F 17/5045 717/136 |
| 2013/0166886 A1 * | 6/2013 | Sasanka | ............... | G06F 9/30098 712/216 |
| 2014/0082327 A1 * | 3/2014 | Ghose | .................. | G06F 9/3877 712/205 |
| 2014/0281424 A1 * | 9/2014 | Bobba | .................. | G06F 9/3005 712/225 |
| 2015/0095628 A1 * | 4/2015 | Yamada | .................. | G06F 21/54 712/234 |
| 2015/0278126 A1 * | 10/2015 | Maniatis | ............... | G06F 9/3867 711/163 |
| 2015/0339217 A1 * | 11/2015 | Avgerinos | ........... | G06F 11/3688 717/132 |
| 2015/0356294 A1 * | 12/2015 | Tan | ........................ | G06F 8/427 726/22 |
| 2015/0370560 A1 * | 12/2015 | Tan | ..................... | G06F 9/30058 717/148 |
| 2016/0179546 A1 * | 6/2016 | Yamada | .................. | G06F 21/54 712/240 |
| 2016/0180079 A1 * | 6/2016 | Sahita | .................... | G06F 21/554 726/22 |
| 2016/0378491 A1 * | 12/2016 | Burger | .................. | G06F 9/3802 712/1 |
| 2016/0378661 A1 * | 12/2016 | Gray | .................... | G06F 9/30043 712/237 |
| 2017/0083319 A1 * | 3/2017 | Burger | .................. | G06F 9/3004 |
| 2017/0102968 A1 * | 4/2017 | Pont | ....................... | G06F 9/4887 |
| 2017/0185803 A1 * | 6/2017 | Shanbhogue | ........... | G06F 21/64 |

OTHER PUBLICATIONS

Nahmsuk Oh et al., Control-Flow Checking by Software Signatures, IEEE vol. 51, No. 2, Mar. 2002, [Retrieved on May 17, 2018]. Retrieved from the internet: <URL: https://pdfs.semanticscholar.org/9562/e82761b96da6228ca68a436fae7cd3f0923a.pdf> 12 Pages (111-122) (Year: 2002).*

Daniel Ziener et al., Concepts for Autonomous Control Flow Checking for Embedded CPUs, 2008, [Retrieved on May 17, 2018]. Retrieved from the internet: <URL: https://link.springer.com/content/pdf/10.1007/978-3-540-69295-9_20.pdf> 15 Pages (234-248) (Year: 2008).*

Mahmood, A. et al., "Concurrent Error Detection Using Watchdog Processors—A Survey," IEEE Transactions on Computers, vol. 37, No. 2, Feb. 1, 1988, pp. 160-174, XP011148724.

Thierry, Michel, "One-Line test in microprocessor based systems," HAL archives-ouvertes.fr, https://tel.archives-ouvertes.fr/tel-00343488, Mar. 5, 1993, pp. 1-283, XP55427067. Abstract Only.

Michel T et al: "A New Approach to Control Flow Checking Without Program Modification", IEEE Comp. Soc. Press, Proceedings of the International Symposium on Fault Tolerant Computing Montreal, Jun. 25-27, 1991, (FTCS), Jun. 25, 1991, pp. 334-341, XP032360621.

* cited by examiner

METHOD AND TOOL FOR GENERATING A PROGRAM CODE CONFIGURED TO PERFORM CONTROL FLOW CHECKING ON ANOTHER PROGRAM CODE CONTAINING INSTRUCTIONS FOR INDIRECT BRANCHING

RELATED APPLICATIONS

This application is a translation of and claims the priority benefit of European patent application number 16183497.3 filed on Aug. 10, 2016, entitled "Method And Tool For Generating A Program Code Configured For Performing A Control Flow Check Of Another Program Code" and French patent application number 1651507 filed Feb. 24, 2016, entitled "Method And Tool For Generating A Program Code Configured For Performing A Control Flow Check Of Another Program Code Including Indirect Branching Instructions" which is hereby incorporated by reference to the maximum extent allowable by law.

FIELD OF THE INVENTION

Modes of implementation and embodiments of the disclosure relate to the generation of program codes intended for checking control flows of programs to be monitored, in particular for checking control flows with disjoint signatures (DSM: Disjoint Signature Monitoring), and most particularly the management of the indirect branch instructions present in the program code to be monitored.

BACKGROUND

Control flow checking (CFC) can be used to verify that the instructions of a program are read without error and in the right order. These checking schemes of the CFC type can be divided into two groups, namely schemes using embedded signatures (ESM: Embedded Signature Monitoring) and those using disjoint signatures (DSM).

In the first case, the reference signatures and the checking directives are embedded in the code to be monitored, in the form of special instructions. In the case of disjoint signatures, the reference signatures and the checking directives are stored in another part of the system memory or in a disjoint memory, which has the drawback of increasing the cost of memory.

Moreover, the monitoring program is generally implemented in a coprocessor commonly dubbed a "Watchdog" and this coprocessor in addition to the fact that it needs to access the memory in an autonomous manner so as not to degrade the performance of the system, needs to also maintain tight synchronization with the processor executing the program code to be monitored.

To perform the control flow checking, the monitoring program needs to be perfectly synchronized with the program to be monitored, in order to be capable of tracking its execution, for the purpose, in particular, of checking the signatures of the basic blocks of which the program is composed, and the transfers of control flows from one basic block to another, generally by means of jump or branch instructions.

Generally, a "Watchdog" instruction is associated with the first and with the last instruction of each basic block of the program to be monitored. At the end of a basic block terminating on a branch instruction, the coprocessor is capable of tracking the processor by itself branching to its own destination instruction corresponding to the target instruction to which the processor has jumped.

The coprocessor can then check that the processor has actually jumped to the correct instruction because the destination instruction of the coprocessor contains the address of the corresponding target instruction in the program of the processor.

It may be seen, therefore, that the synchronization between the processor and the coprocessor is based on the link between the processor instructions and the coprocessor instructions. This is possible only if the target of each branch of the code to be monitored is known before its execution, so that the corresponding coprocessor branch instruction can be created.

However, indirect branches may be present in the program code to be monitored. As is well known to those skilled in the art, a direct branch is a branch whose branch instruction target address can be calculated on the basis of the instruction alone (the code and the address).

Indirect branches are all those branches which are not direct, for example, those for which the calculation of the target address uses the values of one or more registers. Thus, for an indirect branch, the target address cannot be known solely on the basis of the instructions of the program code, since, by definition, this address depends on the execution of the program code.

Moreover, an indirect branch may have multiple target addresses. Also, a coprocessor of the "Watchdog" type is currently capable of managing only a single target address encoded in the branch instruction of its program code.

This problem is particularly significant in the context of DSM methods. Consequently, most DSM methods do not deal with the matter of indirect branches, meaning that the code to be monitored cannot contain any of these indirect branches.

However, indirect branches are commonly used in embedded programs, since they can be used to reduce the size of the code and the cycle penalties. In some cases of indirect branching, a set of legitimate targets can be determined before the execution of the program. In this case, the coprocessor program can be constructed in full. However, the problem of managing multiple targets remains.

In fact, the addresses to which the coprocessor has to branch are currently encoded in branch instructions which do not offer enough bits to encode multiple addresses.

Furthermore, even if multiple addresses can be stored, using a table for example, each of them has to be linked with the corresponding address of the processor; otherwise, the coprocessor cannot know which address to branch to.

Moreover, in addition to the indirect branches whose multiple targets are predictable, there may exist indirect branches whose targets are not predictable, since for example, the addresses of these targets may depend on one or more parameters whose values may themselves depend on the execution of the program.

In fact in theory the address of any target is predictable. But in practice in certain cases, such as in particular that mentioned hereinabove, the possibilities can become so numerous that it becomes almost impossible to provide for all the possible branches. This is the reason why these indirect branches are then referred to as "non-predictable".

Among these "non-predictable" indirect branches may be cited the indirect jump instructions. Among the other possible indirect branches may also be cited the instructions of function calls whose branches may also depend in certain cases on parameters having non-predictable values.

A need therefore exists to generate a program code for monitoring a program code to be monitored which can manage in a simple and effective manner the indirect branches present in the program code to be monitored, and in particular, those leading to multiple targets, whether or not these indirect branches are predictable.

SUMMARY

According to one aspect, there is proposed a method for generating a main program code intended to be executed by a main processing unit, for example, a processor core, and an auxiliary program code intended to be executed by an auxiliary processing unit, for example, a coprocessor of the "Watchdog" type, for checking the control flow of the main program.

According to a general characteristic of this aspect, the generation of the main program code comprises the generation of at least one main indirect branch instruction, while the generation of the auxiliary program code comprises the generation of at least one auxiliary indirect branch instruction associated with the at least one main indirect branch instruction.

Moreover, the generation of the main program code furthermore comprises at least one insertion of at least one synchronization information item intended to be processed by the auxiliary processing unit and configured to allow at least one synchronization between a part of the auxiliary program code resulting from the execution of the at least one auxiliary indirect branch instruction and a part of the main program code resulting from the execution of the at least one main indirect branch instruction.

Thus, according to this aspect at least one synchronization point, generally several synchronization points, is/are advantageously placed in the main program code, that is to say the program code to be monitored, which is (are) associated with a part of the main program code resulting from the execution of an indirect branch instruction. Also, this (these) synchronization point(s) will be able to be accessible to the auxiliary processing unit in such a way that the auxiliary processing unit can synchronize itself during the execution of its own indirect branch instruction.

In addition, the number of synchronization points in the main program code can be as large as the number of possible branches (resulting from the indirect branch instructions) for which one wishes to perform a synchronization, such not being the case when using a memory whose size limits the number of branches to be synchronized.

According to one mode of implementation in which the potential auxiliary branches resulting from the execution of the at least one auxiliary indirect branch instruction and the potential main branches resulting from the execution of the at least one main indirect branch instruction are predictable, the generation of the main program code comprises insertions of synchronization information items intended to be processed by the auxiliary processing unit and configured to allow synchronizations between the potential auxiliary branches resulting from the execution of the at least one auxiliary indirect branch instruction and the potential main branches resulting from the execution of the at least one main indirect branch instruction.

These potential branches can be predicted and determined by analyzing the main program code. Thus, if they are, for example, linked with the value of a register capable of taking a predetermined set of values, a potential branch and its associated target address can be defined during the analysis of the code, for each value of the register among the predetermined set of values.

Thus, according to this mode of implementation, the part of the main program code and the part of the auxiliary program code which will be synchronized are the various branches resulting from the execution of an indirect branch instruction, and synchronization points are advantageously placed in the main program code, that is to say the program code to be monitored, which are associated with the various branches resulting from the execution of an indirect branch instruction. These synchronization points will also be accessible to the auxiliary processing unit so that the auxiliary processing unit knows which branch to use during the execution of its own indirect branch instruction.

By placing these synchronization points in the program code, it is also possible to effectively manage predictable multiple target addresses in these indirect branches, while avoiding, for example, the use of special memories such as content addressable memories (CAM) to store the various target addresses of these branch instructions.

Indeed, this type of memory is costly in terms of access, because of the number of comparisons to be made. Furthermore, the number of targets is limited by the length of the memory, which is not the case where synchronization points are inserted into the main program code.

The auxiliary program code is generally intended to be stored in an auxiliary memory, while the main program code is generally intended to be stored in a main memory.

According to one embodiment, the potential main branches point to a plurality of target main addresses of the main memory, and the synchronization information items are associated, respectively, with these target main addresses, and designate, respectively, target auxiliary addresses in the auxiliary program memory.

The potential auxiliary branches then point, respectively, to the target auxiliary addresses.

Additionally, the at least one auxiliary indirect branch instruction is configured to select, during its execution, the potential auxiliary branch associated with the target auxiliary address designated by the synchronization information items delivered by the main memory after the delivery of the main indirect branch instruction.

According to one mode of implementation in which a program can be represented by a control flow graph (CFG) the generation of the main program code comprises a generation of main basic blocks of main instructions comprising at least one first main basic block terminating with the main indirect branch instruction and several target main basic blocks beginning respectively at the target main addresses.

Of course, the term "first" associated with the main basic block terminating with the main indirect branch instruction is simply used here to distinguish this main basic block from the other main basic blocks not terminating with an indirect branch instruction, without of course this "first" main basic block necessarily being the "first" of the blocks in the graph. It can of course be situated at any position in the graph.

Similarly, according to this mode of implementation, the generation of the auxiliary program code comprises the generation of auxiliary basic blocks of auxiliary instructions associated with the main basic blocks and comprising at least a first auxiliary basic block associated with the first main basic block and terminating in the auxiliary indirect branch instruction, and a plurality of target auxiliary basic blocks starting, respectively, at the target auxiliary addresses.

The generation of the main program code then also comprises, for each target main basic block, the insertion into the main program code of at least one complementary main instruction containing the synchronization instruction designating the corresponding target auxiliary address, and the auxiliary indirect branch instruction is an instruction configured so that, during its execution by the auxiliary processing unit, it forces this auxiliary processing unit to wait for the delivery of one of the target auxiliary addresses.

Stated otherwise, at least one complementary main instruction, containing the corresponding target auxiliary address for the auxiliary processing unit, is inserted into the main program code, and the auxiliary indirect branch instruction is configured, for example, by assigning to it a special operation code (known to those skilled in the art by the name "opcode"), so that its execution by the coprocessor causes it to wait for the delivery of one of the target auxiliary addresses by the main program code before its own branching takes place.

There are several possibilities for implementing the delivery of the synchronization information designating the corresponding target auxiliary address.

A first possibility is particularly well suited to a so-called "dual issue" processor architecture, that is to say whose program code is organized into packets (or "bundles") which can contain one or two instructions (at each cycle the processor can execute one or indeed two instructions).

According to this first possibility, each memory location of the main memory has a storage capacity of two instruction words so as to be able to store a packet ("bundle") of two instructions. And in this case, the instruction pair situated at the start of each target main basic block may comprise a target main instruction of the main program code intended for the main processing unit, and the complementary main instruction intended for the auxiliary processing unit and containing the corresponding target auxiliary address.

In the case where the main processing unit is not a processor of the "dual issue" type, that is to say that the memory location of the main memory has a storage capacity of one instruction word, provision may be made for each target main block to start with a set of instructions, containing the at least one complementary main instruction, configured to provide the target auxiliary address corresponding to the auxiliary processing unit and together having a null semantics in relation to the main processing unit.

A null semantics in relation to the main processing unit is interpreted as a set of instructions producing no effect, during its execution, on the course of the program of the main processing unit.

Thus, for example, this set of instructions can comprise a first instruction of the type "stack an immediate value on a stack (memory)", this immediate value being the target auxiliary address to be transmitted to the auxiliary processing unit, followed by an instruction to "decrement the stack pointer" to erase this value from the stack.

It is therefore seen that these two successive instructions ultimately have no impact on the program code executed by the processor.

According to yet another possibility compatible also with a memory location of the main memory having a storage capacity of one instruction word, it is possible to use the operation code ("Opcode") of an instruction which is generally incorporated in the instruction.

Thus, in the case where there exists at least one "opcode" not used by the main processing unit, provision may advantageously be made for each target main block to start with an additional instruction, forming the at least one complementary main instruction, containing an operation code (opcode) corresponding to an operation not used by the main processing unit. Stated otherwise this "opcode" is free. And in this case, this additional instruction is intended for the auxiliary processing unit and contains the target auxiliary address to be provided to the auxiliary processing unit.

Moreover, since this additional instruction is intended also to be delivered to the main processing unit, it is necessary for the operation code (opcode) of the additional instruction to be intended to be replaced with operation code (opcode) corresponding to a non-operation (NOP: "No OPeration") before delivery to the main processing unit of this additional instruction.

Thus, this additional instruction whose "opcode" has been modified will have no effect on the processor.

As a variation, the at least one main indirect branch instruction can be a main indirect jump instruction incorporated in a function of the main program code, the at least one auxiliary indirect branch instruction can be an auxiliary indirect jump instruction incorporated in a function of the auxiliary program code, and the potential auxiliary branches resulting from the execution of the at least one auxiliary indirect jump instruction and the potential main branches resulting from the execution of the at least one main indirect jump instruction are non-predictable.

The function of the main program code comprises at the minimum a main return instruction, and the function of the auxiliary program code also comprises at the minimum an auxiliary return instruction.

The at least one synchronization information item intended to be processed by the auxiliary processing unit is then advantageously configured to allow at least one synchronization between the main return instruction and the auxiliary return instruction.

Thus, regardless the target of the non-predictable indirect jump, at least one synchronization between the main processing unit and the auxiliary processing unit is ensured at least during the execution of the respective return instructions.

This said, in practice a function can comprise in addition to the non-predictable indirect jump instruction, other branch instructions, direct or indirect, for example jumps, in particular but not necessarily indirect, predictable or not or else call instructions predictable or not.

And in this case, synchronization points are advantageously placed at the level of these other branch instructions but also at the level of the non-predictable indirect jump instruction.

Thus according to this mode of implementation, the part of the main program code and the part of the auxiliary program code which will be synchronized, are the non-predictable indirect jump instruction and these other branch instructions which might not stem directly from the non-predictable indirect jump instruction. And, therefore, the synchronization may occur, admittedly within the function, but several cycles after the execution of the non-predictable indirect jump instruction.

Stated otherwise, according to a mode of implementation in which the function of the main program code furthermore comprises at least one supplementary main branch instruction while the function of the auxiliary program code furthermore comprises at least one supplementary auxiliary branch instruction, the generation of the main program code comprises insertions of synchronization information items intended to be processed by the auxiliary processing unit and configured to allow synchronizations between the main return instruction and the auxiliary return instruction, between the at least one main indirect jump instruction and the at least one auxiliary indirect jump instruction, and between each supplementary main branch instruction and each supplementary auxiliary branch instruction.

More precisely, according to a mode of implementation, the auxiliary program code being intended to be stored in an auxiliary memory and the main program code being intended to be stored in a main memory, the synchronization information items are respectively associated with the main return instruction, with the at least one main indirect jump instruction and with each supplementary main branch instruction and respectively designate auxiliary destination addresses in the auxiliary program memory at which are respectively stored the auxiliary return instruction, the at least one auxiliary indirect jump instruction and each supplementary auxiliary branch instruction.

Moreover the at least one auxiliary indirect jump instruction is configured to select, during its execution, the auxiliary branch associated with the auxiliary destination address designated by the synchronization information item delivered by the main memory subsequent to the delivery of the main indirect jump instruction.

In this regard, according to a mode of implementation, the generation of the main program code comprises for the main return instruction, the at least one main indirect jump instruction and each supplementary main branch instruction, an insertion into the main program code of at least one suppletive or supplemental main instruction containing the corresponding synchronization information item designating the corresponding auxiliary destination address, and the at least one auxiliary indirect jump instruction is configured to force, during its execution by the auxiliary processing unit, this auxiliary processing unit to wait for the delivery of one of the auxiliary destination addresses.

In the case of an architecture of the "dual issue" type, that is to say in the case where each memory location of the main memory has a storage capacity of two instruction words, any pair of instructions comprising either the at least one main indirect jump instruction or a supplementary main branch instruction or a main return instruction also contains the corresponding suppletive main instruction intended for the auxiliary processing unit and containing the corresponding auxiliary destination address.

As a variation the at least one main indirect branch instruction can be a main indirect call instruction incorporated as a function of the main program code while the at least one auxiliary indirect branch instruction is an auxiliary indirect call instruction incorporated in a function of the auxiliary program code.

In this case the main program code can comprise several other functions and the auxiliary program code can comprise several other functions.

The generation of the main program code then advantageously comprises insertions of synchronization information items intended to be processed by the auxiliary processing unit and configured to allow respective synchronizations between the inputs of all the functions of the main program code and the inputs of all the functions of the auxiliary program code.

More precisely, the auxiliary program code being intended to be stored in an auxiliary memory and the main program code being intended to be stored in a main memory, the synchronization information items are respectively associated with the initial instructions of all the functions of the main program code and respectively designate auxiliary destination addresses in the auxiliary program memory at which are respectively stored the initial instructions of all the functions of the auxiliary program code, and the at least one auxiliary indirect call instruction is advantageously configured to select, during its execution, the auxiliary branch associated with the auxiliary destination address designated by the synchronization information item delivered by the main memory subsequent to the delivery of the main indirect call instruction.

More precisely, according to a mode of implementation, the generation of the main program code comprises for each function of the main program code, an insertion into the main program code of at least one suppletive main instruction associated with the initial instruction of this function and containing the corresponding synchronization information item designating the corresponding auxiliary destination address, and the at least one auxiliary indirect call instruction is configured to force, during its execution by the auxiliary processing unit, this auxiliary processing unit to wait for the delivery of one of the auxiliary destination addresses.

Within the framework of an architecture of the "dual issue" type, each memory location of the main memory has a storage capacity of two instruction words, and the pair of instructions situated at the start of each function of the main program code comprises a main instruction of the main program code, intended for the main processing unit, and the suppletive main instruction intended for the auxiliary processing unit and containing the corresponding auxiliary destination address.

In the case where the main processing unit is not a processor of the "dual issue" type, that is to say that each memory location of the main memory has a storage capacity of one instruction word, each function of the main program code can advantageously start with a set of instructions containing the at least one suppletive main instruction and configured to provide the auxiliary destination address corresponding to the auxiliary processing unit and together having a null semantics in relation to the main processing unit.

As a variation, still in the case where each memory location of the main memory has a storage capacity of one instruction word, each main instruction comprises an operation code, and each function of the main program code can start with an additional instruction, forming the suppletive main instruction, containing an operation code corresponding to an operation not used by the main processing unit, intended for the auxiliary processing unit and containing the auxiliary destination address to be provided to the auxiliary processing unit; the operation code of the additional instruction is intended to be replaced with an operation code corresponding to a non-operation (NOP) before delivery to the main processing unit of the additional instruction.

Of course, it is possible to combine the implementations relating to the processing of the instructions of predictable indirect branches with those relating to the instructions of non-predictable indirect branches, such as for example, the instructions of non-predictable indirect jumps and the instructions of indirect calls.

According to another aspect, a computing tool is proposed, for example, a compiler, comprising generating means or a generator configured to generate a main program code to be executed by a main processing unit and an auxiliary program code to be executed by an auxiliary processing unit, for checking the control flow of the main program code.

According to a general characteristic of this other aspect, the generating means are configured to generate at least one main indirect branch instruction, at least one auxiliary indirect branch instruction associated with the at least one main indirect branch instruction and to insert at least one synchronization information item intended to be processed by the auxiliary processing unit and configured to allow at least one synchronization between a part of the auxiliary program code resulting from the execution of the at least one auxiliary indirect branch instruction and a part of the main program code resulting from the execution the at least one main indirect branch instruction.

According to one embodiment in which the potential auxiliary branches resulting from the execution of the at least one auxiliary indirect branch instruction and the potential main branches resulting from the execution of the at least one main indirect branch instruction are predictable, the generating means are configured to insert synchronization information items intended to be processed by the auxiliary processing unit and configured to allow synchronizations between the potential auxiliary branches intended to arise from the execution the at least one auxiliary indirect branch instruction and the potential main branches intended to arise from the execution of the at least one main indirect branch instruction.

According to one embodiment, the auxiliary program code is intended to be stored in an auxiliary memory, the main program code is intended to be stored in a main memory, and the generating means are configured to:

make the potential main branches point to several target main addresses of the main memory;

associate the synchronization information items, respectively, with these target main addresses, and make them designate, respectively, target auxiliary addresses in the auxiliary program memory;

make the potential auxiliary branches point respectively to the target auxiliary addresses; and configure the at least one auxiliary indirect branch instruction to select, during its execution, the potential auxiliary branch associated with the target auxiliary address designated by the synchronization information item delivered by the main memory subsequent to the delivery of the main indirect branch instruction.

According to one embodiment, the generating means are configured to generate main basic blocks of main instructions, comprising at least a first main basic block terminating in the main indirect branch instruction, and a plurality of target main basic blocks starting, respectively, at the target main addresses;

auxiliary basic blocks of auxiliary instructions associated with the main basic blocks and comprising at least a first auxiliary basic block associated with the first main basic block and terminating in the auxiliary indirect branch instruction, and a plurality of target auxiliary basic blocks starting, respectively, at the target auxiliary addresses;

and the generating means are furthermore able to insert into the main program code, for each target main basic block, at least one complementary main instruction containing the synchronization information item designating the corresponding target auxiliary address, and to configure the auxiliary indirect branch instruction to force, during its execution by the auxiliary processing unit, this auxiliary processing unit to wait for the delivery of one of the target auxiliary addresses.

According to a possible embodiment, each memory location of the main memory has a storage capacity of two instruction words, and the generating means are configured to generate a pair of instructions situated at the start of each target main basic block so that it possibly comprises a target main instruction of the main program code intended for the main processing unit, together with the complementary main instruction intended for the auxiliary processing unit and containing the corresponding target auxiliary address.

According to another possible embodiment, each memory location of the main memory has a storage capacity of one instruction word, and the generating means are configured to make each target main block start with a set of instructions, containing the complementary main instruction, configured to provide the corresponding target auxiliary address to the auxiliary processing unit and having, jointly, a null semantics in relation to the main processing unit.

According to yet another possible embodiment, each memory location of the main memory has a storage capacity of one instruction word, each main instruction comprises an operation code (opcode) contained in this main instruction, and the generating means are configured to make each target main block start with an additional instruction containing an operation code corresponding to an operation not used by the main processing unit, intended for the auxiliary processing unit and containing the target auxiliary address to be provided to the auxiliary processing unit.

According to a variation the at least one main indirect branch instruction is a main indirect jump instruction incorporated in a function of the main program code comprising a main return instruction and the at least one auxiliary indirect branch instruction is an auxiliary indirect jump instruction incorporated in a function of the auxiliary program code comprising an auxiliary return instruction, the potential auxiliary branches resulting from the execution of the at least one auxiliary indirect jump instruction and the potential main branches resulting from the execution of the at least one main indirect jump instruction being non-predictable.

The generating means are then advantageously configured to insert the at least one synchronization information item intended to be processed by the auxiliary processing unit so as to allow at least one synchronization between the main return instruction and the auxiliary return instruction.

According to one embodiment in which the function of the main program code furthermore comprises at least one supplementary main branch instruction and the function of the auxiliary program code furthermore comprises at least one supplementary auxiliary branch instruction, the generating means are configured to insert synchronization information items intended to be processed by the auxiliary processing unit so as to allow synchronizations between the main return instruction and the auxiliary return instruction, between the at least one main indirect jump instruction and the at least one auxiliary indirect jump instruction, and between each supplementary main branch instruction and each supplementary auxiliary branch instruction.

According to one embodiment, the auxiliary program code is intended to be stored in an auxiliary memory, the main program code is intended to be stored in a main memory, and the generating means are configured to associate the synchronization information items respectively with the main return instruction, with the at least one main indirect jump instruction and with each supplementary main branch instruction and make them respectively designate auxiliary destination addresses in the auxiliary program memory at which are respectively stored the auxiliary return instruction, the at least one auxiliary indirect jump instruction and each supplementary auxiliary branch instruction; and configure the at least one auxiliary indirect jump instruction to select, during its execution, the auxiliary branch associated with the auxiliary destination address designated by the synchronization information item delivered by the main memory subsequent to the delivery of the main indirect jump instruction.

More precisely, according to one embodiment, the generating means are configured to insert into the main program code, for the main return instruction, the at least one main indirect jump instruction and each supplementary main branch instruction, at least one suppletive main instruction containing the corresponding synchronization information item designating the corresponding auxiliary destination address; and configure the at least one auxiliary indirect jump instruction to force, during its execution by the auxiliary processing unit, this auxiliary processing unit to wait for the delivery of one of the auxiliary destination addresses.

According to a possible embodiment which is compatible with an architecture of the "dual issue" type, in which each memory location of the main memory has a storage capacity of two instruction words, the generating means are configured to incorporate in any pair of instructions comprising either the at least one main indirect jump instruction or a supplementary main branch instruction or a main return instruction, the corresponding suppletive main instruction intended for the auxiliary processing unit and containing the corresponding auxiliary destination address.

According to another variation, the at least one main indirect branch instruction can be a main indirect call instruction incorporated in a function of the main program code while the at least one auxiliary indirect branch instruction is an auxiliary indirect call instruction incorporated in a function of the auxiliary program code.

The main program code then, for example, comprises several other functions and the auxiliary program code comprises several other functions.

The generating means are then advantageously configured to insert synchronization information items intended to be processed by the auxiliary processing unit and configured to allow respective synchronizations between the inputs of all the functions of the main program code and the inputs of all the functions of the auxiliary program code.

According to one embodiment, the auxiliary program code is intended to be stored in an auxiliary memory, the main program code is intended to be stored in a main memory, and the generating means are configured to associate the synchronization information items respectively with the initial instructions of all the functions of the main program code and make them respectively designate auxiliary destination addresses in the auxiliary program memory at which are respectively stored the initial instructions of all the functions of the auxiliary program code; and configure the at least one auxiliary indirect call instruction to select, during its execution, the auxiliary branch associated with the auxiliary destination address designated by the synchronization information item delivered by the main memory subsequent to the delivery of the main indirect call instruction.

More precisely, according to an embodiment, the generating means are configured to insert into the main program code, for each function of the main program code, at least one suppletive main instruction associated with the initial instruction of this function and containing the corresponding synchronization information item designating the corresponding auxiliary destination address; and configure the at least one auxiliary indirect call instruction to force, during its execution by the auxiliary processing unit, this auxiliary processing unit to wait for the delivery of one of the auxiliary destination addresses.

According to a possible embodiment compatible with an architecture of the "dual issue" type, each memory location of the main memory has a storage capacity of two instruction words, and the generating means are configured to generate the pair of instructions situated at the start of each function of the main program code so that it comprises a main instruction of the main program code, intended for the main processing unit, and the suppletive main instruction intended for the auxiliary processing unit and containing the corresponding auxiliary destination address.

In the case where the architecture is not of the "dual issue" type, according to another possible embodiment, each memory location of the main memory has a storage capacity of one instruction word, and the generating means are configured to generate each function of the main program code so that it starts with a set of instructions containing the at least one suppletive main instruction and configured to provide the auxiliary destination address corresponding to the auxiliary processing unit and together having a null semantics in relation to the main processing unit.

According to yet another possible embodiment in which each memory location of the main memory has a storage capacity of one instruction word, each main instruction comprises an operation code, and the generating means are configured to generate each function of the main program code so that it starts with an additional instruction, forming the suppletive main instruction, containing an operation code corresponding to an operation not used by the main processing unit, intended for the auxiliary processing unit and containing the auxiliary destination address to be provided to the auxiliary processing unit.

The generating means are also advantageously configured for generating an auxiliary program code adapted to perform disjoint signature monitoring on the control flow of the main program code.

According to another aspect, a computer system is proposed, comprising a main processing unit, for example a processor, an auxiliary processing unit, for example a coprocessor, a main memory coupled to the main processing unit and to the auxiliary processing unit and containing a main program code generated by the method as defined above or by the computing tool as defined above, and an auxiliary memory coupled to the auxiliary processing unit and containing an auxiliary program code generated by the method as defined above or by the computing tool defined above.

BRIEF DESCRIPTION OF THE DRAWINGS

Other advantages and characteristics of the disclosure will become apparent on examining the detailed description of wholly non-limiting modes of implementation and embodiments, and the appended drawings in which.

DETAILED DESCRIPTION

Figure 1:
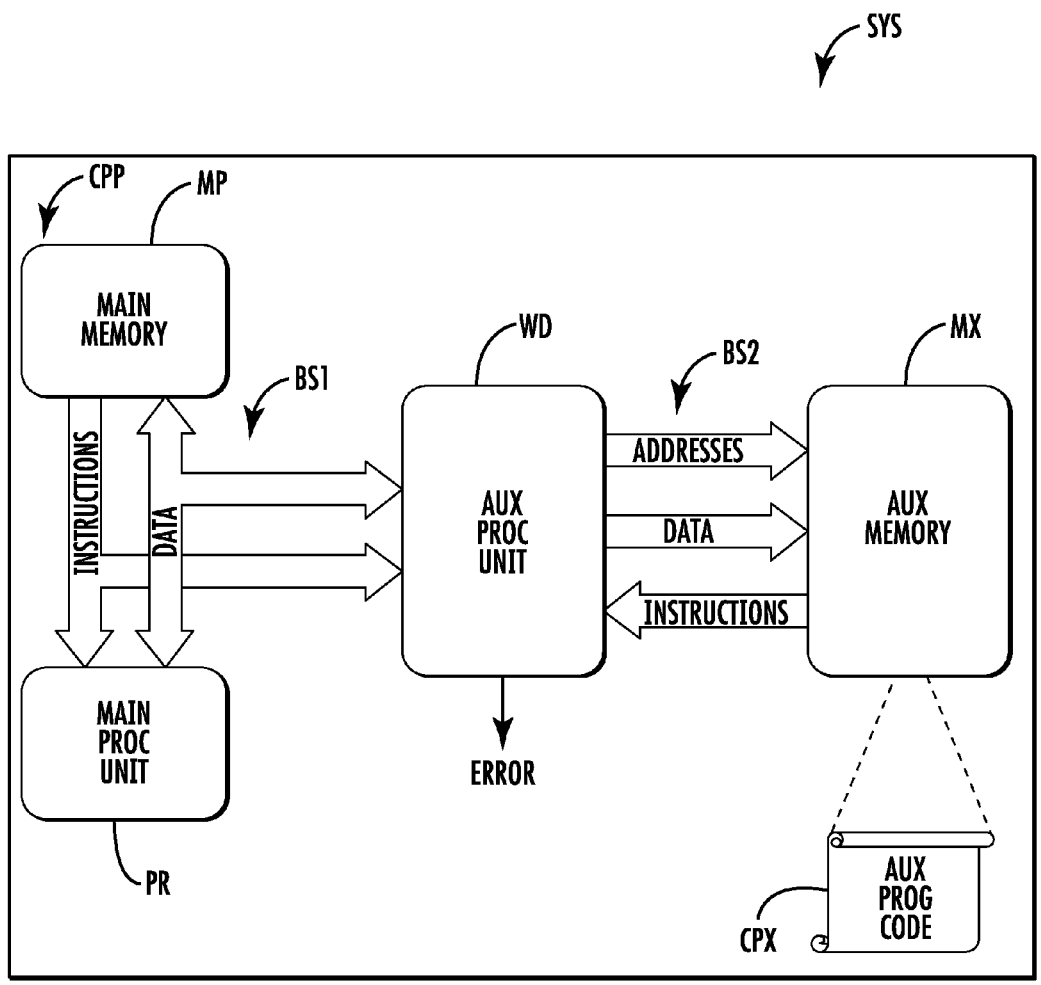
FIGS. 1 to 15 schematically illustrate various modes of implementation and embodiments of the disclosure.

In FIG. 1, the reference SYS designates a computer or computing system comprising a main processing unit PR, for example a processor core, and an auxiliary processing unit WD, for example a coprocessor of the "watchdog" type intended as will be seen hereinafter to monitor the control flow of a program code executed by the main processing unit PR.

In this regard, the system SYS comprises a main memory MP containing the program code CPP to be executed by the main processing unit PR and an auxiliary memory MX containing the auxiliary program code CPX to be executed by the auxiliary processing unit WD for the purpose of monitoring the execution of the main program code CPP.

In this regard, the instructions and data extracted from the main memory MP and intended for the main processing unit PR are conveyed by a bus BS1, for example, and are also visible to the auxiliary processing unit WD.

Moreover, the addresses, data and instructions required for the execution of the auxiliary program code CPX by the auxiliary processing unit WD are conveyed by a bus BS2 between the auxiliary processing unit WD and the auxiliary memory MX.

Figure 2:
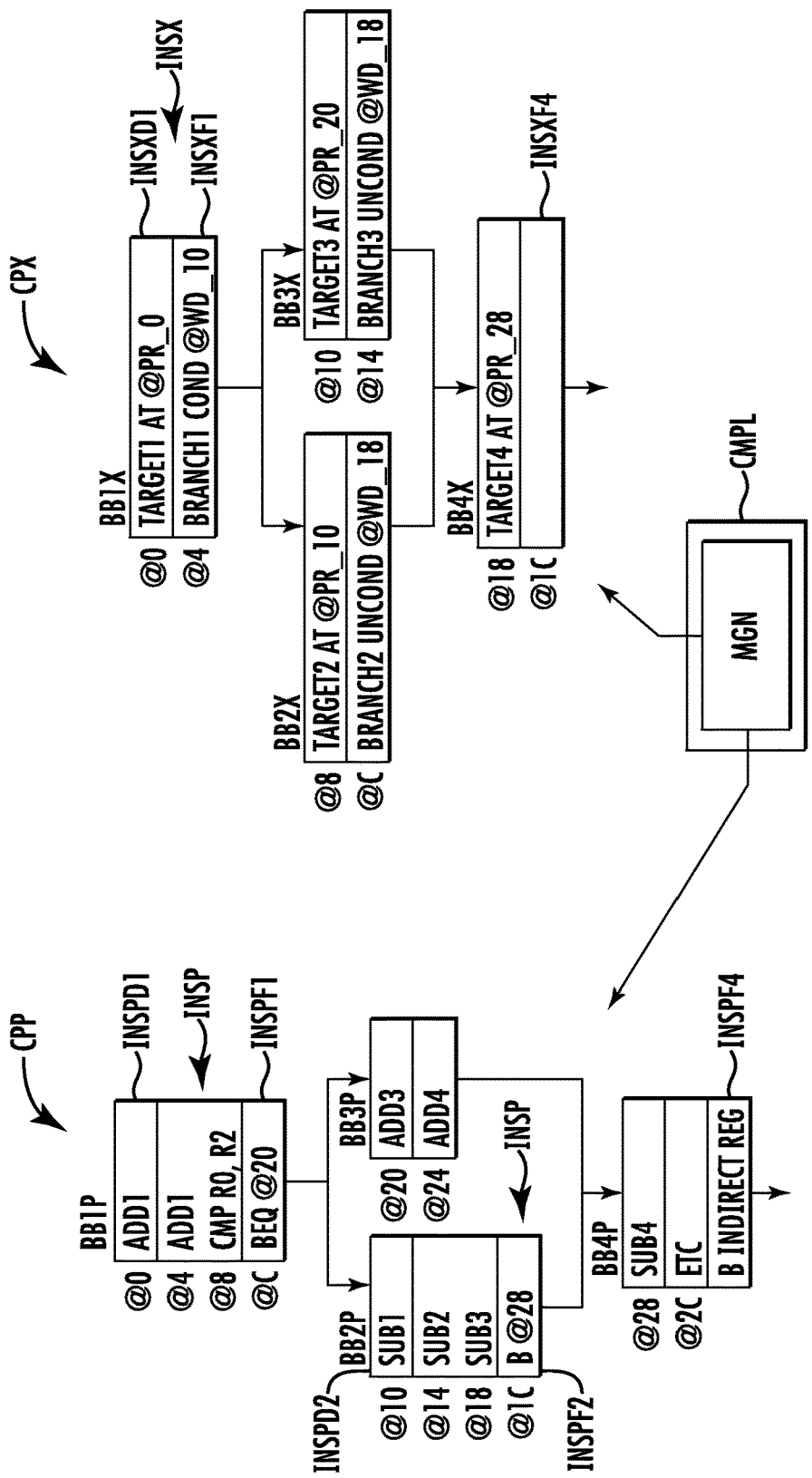

With more particular reference now to FIG. 2, it can be seen that the main program code CPP and the auxiliary program code CPX are generated by generating means or generator MGN, generally in the form of software, of a computing generating tool such as a compiler CMPL.

Conventionally, during the compilation of a source code, the compiler analyses the syntax of the source code of the program and defines an intermediate code (or skeleton) in which it can tag particular instructions such as, for example, direct or indirect branch instructions. The intermediate code is then converted into executable program code.

In FIG. 2, each program code, for example, its intermediate code, has been represented in the form of a control flow graph (CFG), in which the blocks represent basic blocks of the program and the arrows are control flow transfers authorized between the basic blocks.

The basic blocks are defined as code sequences having a single entry point and a single exit point, meaning that no instruction within a basic block can force the corresponding processing unit to exit from this basic block. Moreover no instruction of the basic block, except the first instruction, can be the target of a branch (or jump). Only the last instruction can force the program to begin the execution of a different basic block.

More precisely, in the present case, the generating means MGN of the compiler have generated, for the main program code CPP, main basic blocks BB1P, BB2P, BB3P, BB4P containing main instructions INSP.

Likewise, the generating means MGN have generated, for the auxiliary program code CPX, auxiliary basic blocks BB1X, BB2X, BB3X, BB4X associated with the main basic blocks BB1P-BB4P respectively, and each containing auxiliary instructions INSX.

Each main basic block, for example, the main basic block BB1P, comprises an initial instruction INSPD1 and a final instruction INSPF1. The final instruction may be a branch instruction.

Likewise, each auxiliary basic block BB1X-BB4X comprises an initial instruction INSXD1 and a final instruction INSXF1.

In the example illustrated in FIG. 2, the final instructions INSXFi of the auxiliary basic blocks BB1X-BB3X are conditional or unconditional branch instructions.

Generally, the initial instruction INSXDi of an auxiliary basic block comprises in particular the operation code (opcode) of the instruction, a field containing the start address of the corresponding instruction in the main program code, the number of instructions of the corresponding main basic block.

Moreover, in the case of control flow checking with disjoint signatures, the final instruction of an auxiliary basic block INSXFi contains a reference signature. Indeed, during the execution of the initial instruction of the auxiliary basic block, the auxiliary processing unit calculates, in a conventional manner known per se, a signature of all the main instructions of the corresponding main basic block, delivered on the bus BS1 and this calculated signature is compared with the reference signature for checking purposes.

Among the main basic blocks and auxiliary basic blocks, the main basic block BB4P, dubbed the first main basic block, and the corresponding auxiliary basic block BB4X, dubbed the first auxiliary basic block, are particular basic blocks, since their final instructions INSPF4 and INSXF4 comprise indirect branch instructions.

These blocks have been referred to as "first" main basic block and as "first" auxiliary basic block so as to differentiate them from the other basic blocks not comprising any indirect branch instructions, without the notion of "first" having any connection with the rank of the basic block in the sequence of basic blocks.

Figure 3:
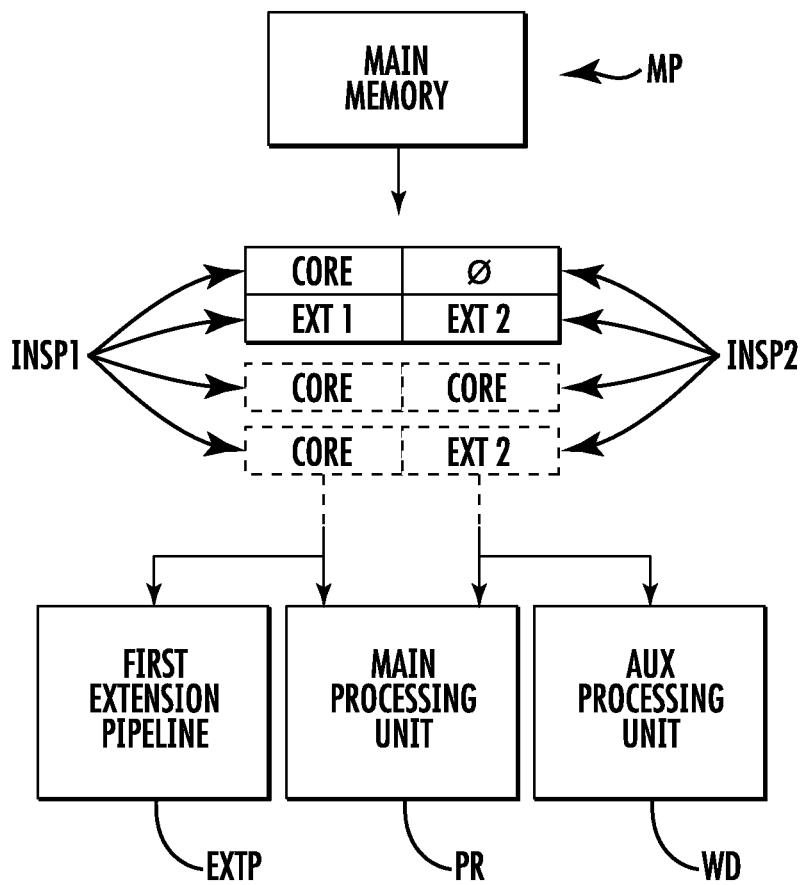

Reference will be made, more particularly, to FIG. 3 and the following figures to illustrate the generation and management of these indirect branch instructions in the main program code and in the auxiliary program code. It is also considered here that these indirect branches are predictable, that is to say that they will induce in the main program code potential branches to predetermined main target addresses.

In this regard, it is now assumed by way of a nonlimiting example, as illustrated in FIG. 3, the main processing unit PR is a so-called "dual issue" processor architecture, that is to say that in one and the same cycle it is capable of processing one or two instructions.

In this regard, each memory location of the main memory MP has a storage capacity of two instructions and the memory MP is capable of delivering during a cycle, on the bus BS1 a packet ("bundle") of main instructions, here a pair of main instructions INSP1, INSP2.

Several cases are then possible. One of the instructions INSP1 or INSP2 may be an instruction referenced "Core" that is to say that it is intended to be executed by the main processing unit PR. One of the instructions referenced "EXT1" may be intended to be executed by a first extension pipeline EXTP.

One of the instructions INSP1 or INSP2 can be an instruction referenced "EXT2" that is to say intended to be executed by a second extension pipeline, which may for example, be the auxiliary processing unit WD. Finally, one of the instructions, referenced by the symbol Ø, may be an empty instruction.

Figure 4:
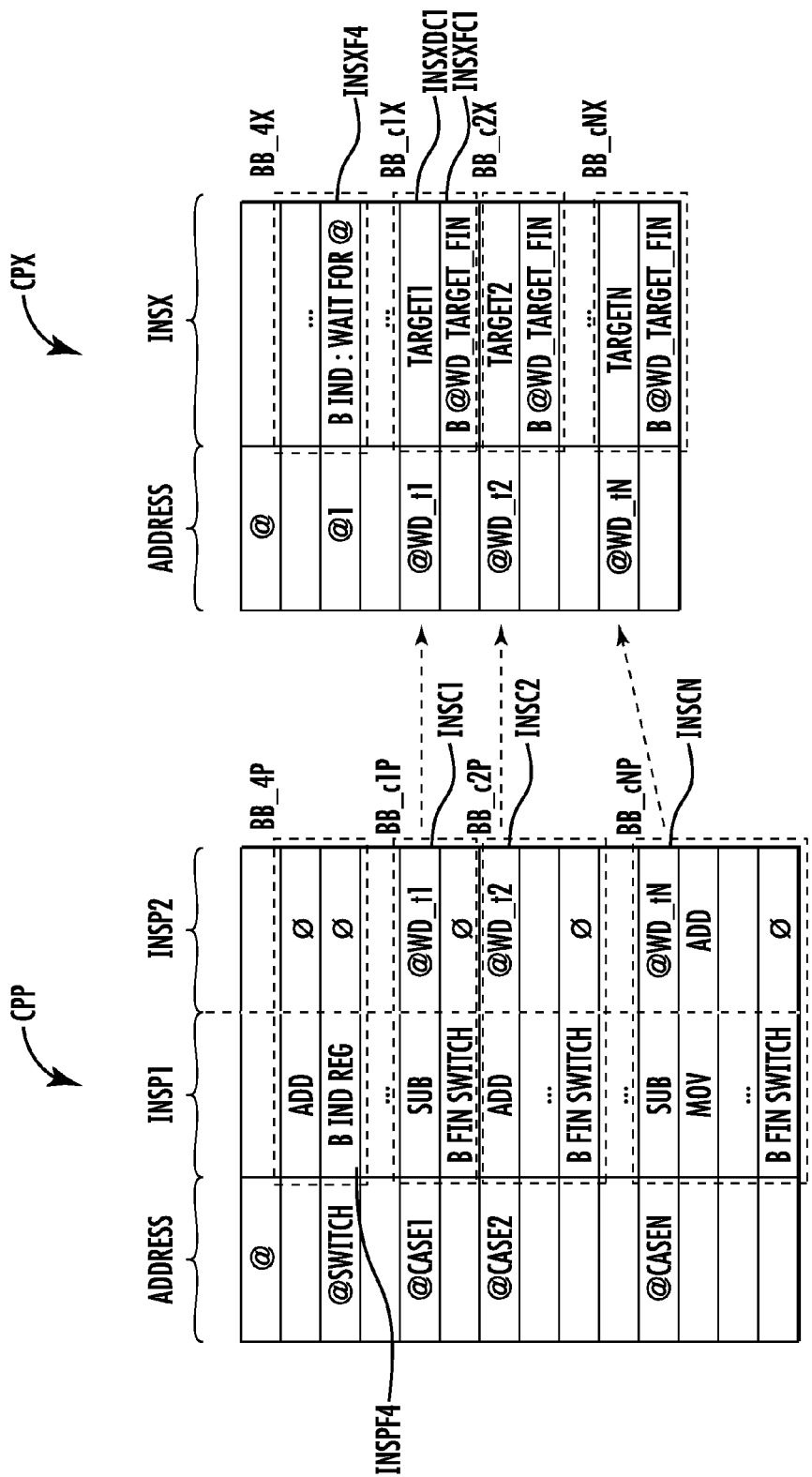

If reference is now made more particularly to FIG. 4, it can be seen that the left-hand part schematically represents the pairs of instructions INSP1, INSP2 delivered by the main memory MP as well as their address @ in the main memory while the right-hand part of FIG. 4 represents the auxiliary instructions INSX with their address @ in the auxiliary memory.

FIG. 4 shows the first main basic block BB4P and the first auxiliary basic block BB4X, terminating respectively with indirect branch instructions.

More precisely, it is assumed in this example that the first final main address of the bundle of instructions situated at the address @switch is the indirect branch instruction B IND REG. This indirect branch instruction will induce potential branches to target main addresses, here the target main addresses @Case1-@CaseN as a function of the value, for example, of a register.

The generating means MGN of the compiler then generate several target main basic blocks BB_c1P-BB_cNP beginning respectively at the target main addresses @Case1-@CaseN.

Also, synchronization information items will be inserted by the generating means MGN of the compiler, these synchronization information items being intended to be processed by the auxiliary processing unit and configured to allow synchronizations between the potential main branches arising from the execution of the main indirect branch instruction B IND Reg and the potential auxiliary branches arising from the execution of the auxiliary indirect branch instruction INSXF4.

The target auxiliary basic blocks BB_c1X-BB_cNX, corresponding to the target main basic blocks BB_c1P-BB_cNP respectively, are generated by the generating means of the compiler CMPL and start, respectively, at the target auxiliary addresses @WD_t1-@WD_tN designated by the corresponding synchronization information items.

In the example described here, these synchronization information items are contained in complementary main instructions INSCN. Here, each complementary instruction is in fact the second instruction INSP2 of the pair of instructions situated at the start of the corresponding target main basic block.

In this regard, just as the compiler can tag the indirect branch instructions since these instructions are labelled, it can tag the target instructions, also labelled, resulting from these indirect branches. Also, of course, in this example, it is appropriate that the second instruction INSP2 of a pair of target instructions resulting from a potential branch be an empty instruction so that the compiler generating means can insert the corresponding complementary instruction INSCi thereinto. This is a constraint parameter of the compiler program.

The first instruction INSP1 of the pair may be an instruction intended for the main processing unit PR, or may possibly be an empty instruction.

Each complementary instruction INSCi comprises a specific operation code (opcode) as well as the target auxiliary address @WD_ti at which the compiler will place the corresponding target auxiliary basic block BB_ciX.

The initial instruction of a target auxiliary basic block, for example, the initial instruction INSXDC1 of the target basic block BB_c1X, comprises, in particular, a specific operation code, the corresponding start address of the instruction of the corresponding target main basic block, in this instance the address @Case1, the number of instructions of the corresponding target main block, and, optionally, the address @1 of the auxiliary indirect branch instruction INSXF4.

Moreover, the final address of a target auxiliary basic block, for example, the address INSXFC1, contains the reference signature enabling the signature to be checked, in a similar way to that described above.

As regards the auxiliary indirect branch instruction INSXF4 generated by the generating means MGN of the compiler, it is assigned a special operation code (opcode) corresponding to a special operation to be performed by the auxiliary processing unit when it processes this operation code, namely a standby waiting for the delivery of the synchronization information items, delivered by the main memory, making it possible to know which auxiliary basic block to point to.

In the present case, this special operation, referenced "Wait for @" is hard-coded in the coprocessor WD, and the latter, when it later executes the auxiliary indirect branch instruction INSXF4 assigned this special operation code, will wait for the synchronization information item, in this instance the target auxiliary address, encoded in the next set of instructions available on the bus BS1.

Figure 5:
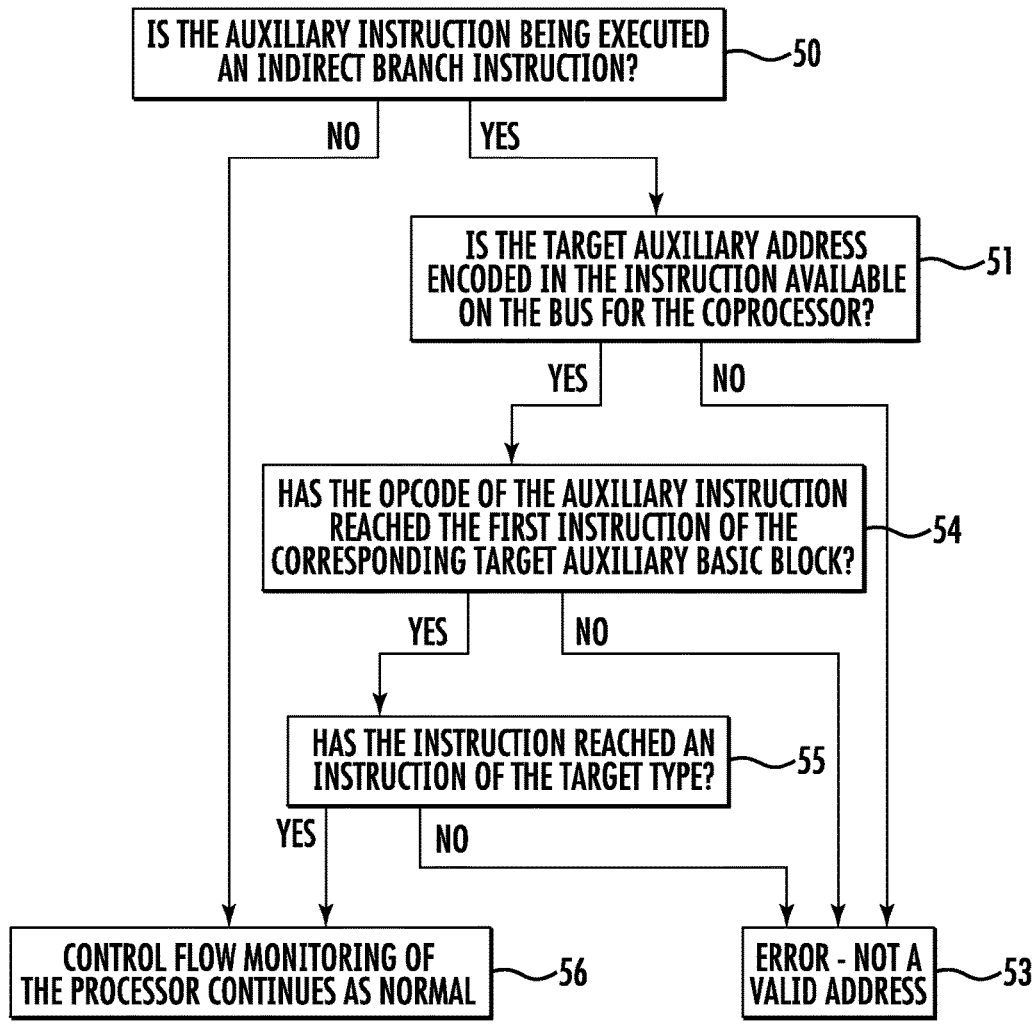

Reference will now be made, more particularly, to FIG. 5, to describe an example of the managing of an indirect branch instruction.

If the auxiliary instruction being executed in step 50 is not an indirect branch instruction, then the conventional managing of the control flow monitoring of the processor continues as normal (step 56).

If on the other hand the instruction currently being executed is an auxiliary indirect branch instruction, then in accordance with what was described above, the coprocessor WD waits for the target auxiliary address encoded in the instruction INSC1 of the pair of instructions which will be available on the bus BS1 (step 51).

If the next pair of instructions does not contain a complementary instruction of the INSCi type, or if the cycle delay exceeds a predetermined delay, then the coprocessor WD sends an error signal (step 53).

If, on the other hand, a complementary instruction INSCi is present in the bundle of instructions extracted from the memory MP, the coprocessor extracts the target auxiliary address from the instruction INSCi and then jumps to the target auxiliary address thus designated, then checks the operation code (opcode) of the auxiliary instruction thus reached, which is assumed to be the first instruction INSXDCi of the corresponding target auxiliary basic block (step 54).

If, for example, the operation code is erroneous, the method goes back to step 53, and an error message is sent.

If, on the other hand, the instruction reached is an instruction of the target type INSXDCi, then it is possible, although not indispensable, to check in step 55 that the address @WD_ti is indeed an address belonging to the target auxiliary addresses related to the auxiliary branch instruction INSXF4. In this regard, the indirect branch instruction address @1 contained in the instruction INSXDCi is compared with this address @1 which has been previously stored in a register during the execution of the indirect branch instruction INSXF4, to check whether it is actually a valid address.

If this is not the case, an error signal is again sent (step 53). In the converse case, the normal monitoring operation proceeds with signature calculation and comparison with the reference signature.

The disclosure is not limited to the modes of implementation and embodiments described above, but encompasses all variations thereof.

If the architecture is not of the "dual issue" type, it is possible to use a set of specific instructions having a null semantic value in relation to the processor PR and containing the complementary instruction used to deliver the target auxiliary address.

Figure 6:
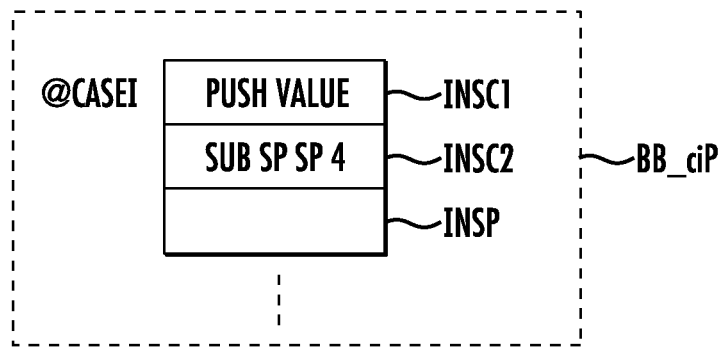

This set of specific instructions, in particular the complementary instruction, is predefined for the auxiliary processing unit, with allowance, in particular, for its hardware architecture. This is the case in the example illustrated in FIG. 6.

In this example, the compiler generates in the main program code CPR, at the start of each target main basic block BB_ciP, that is to say at the address @Casei, the complementary instruction INSC1 containing, for example, a "PUSH value" instruction which stacks the value "value" in a stack managed in the sense of increasing addresses, this value "value" being the target auxiliary address of the target auxiliary basic block corresponding to this target main basic block.

Next, this instruction INSC1 is followed by an instruction INSC2 of the type "SUB SP SP 4" which makes it possible to erase this value from the stack managed here in the sense of increasing addresses. Therefore, the two instructions INSC1 and INSC2 are transparent to the processor PR. The other main instruction or instructions INSP of the target main basic block BB_ciP then follow the instruction INSC2.

Figure 7:
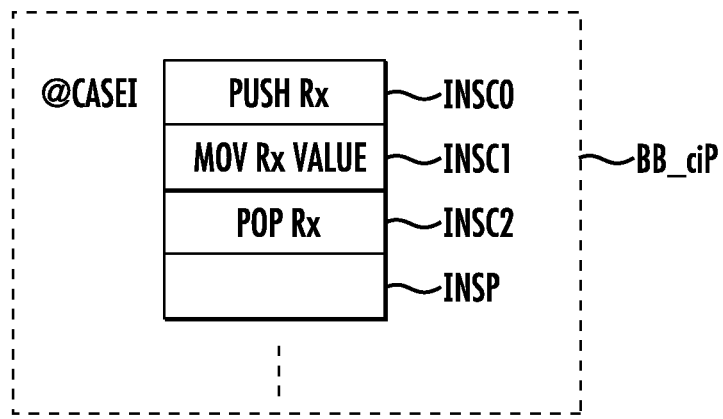

If stacking an immediate value is not possible, then a register can be used and in this case, as illustrated in FIG. 7, its initial value is firstly saved on the stack (memory) by an instruction INSC0, generated by the compiler at the start of each target main basic block BB_ciP, that is to say at the address @Casei, of the "PUSH Rx" type and then this instruction INSC0 is followed with an instruction INSC1 of the "MOV Rx value" type, that is to say an instruction which places the desired value "value" in the register Rx, this desired value being the target auxiliary address. This instruction of the "MOV Rx value" type is here the predefined complementary instruction that will be processed by the auxiliary processing unit.

Finally, the instruction INSC1 is followed with an instruction INSC2 of the "POP Rx" type which pops the previously stacked value from the register Rx so as to return to the same state. Here again, this predefined set of three instructions has a null semantics in relation to the processor PR.

Figure 8:
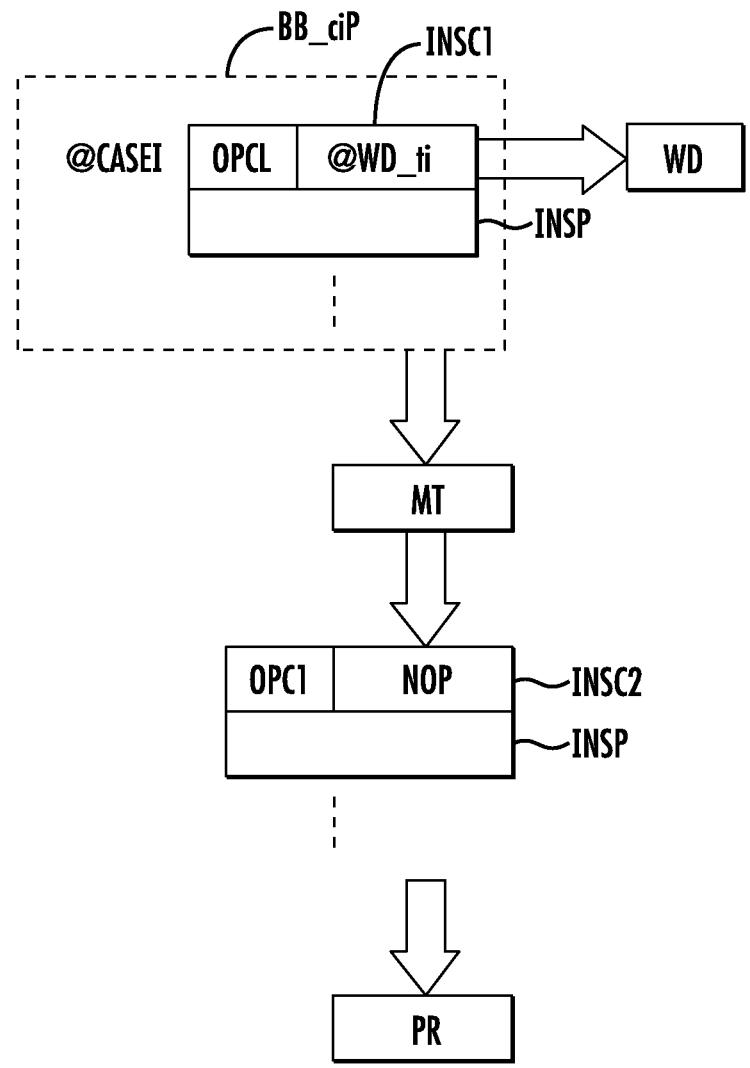

The other main instruction or instructions INSP of the target main basic block BB_ciP then follow the instruction INSC2. Another possibility is illustrated in FIG. 8.

Still in the case where each memory location of the main memory can store only one instruction, and in the case where there is at least one free operation code (opcode), that is to say an opcode not used by the processor PR, the generating means MGN of the compiler can generate, at the start of each target main basic block BB_ciP, that is to say at the address @Casei, a complementary instruction INSC1 using this free operation code OPCL and containing the synchronization information item @WD_ti, which will enable the coprocessor WD to retrieve the corresponding target auxiliary address.

The other main instruction or instructions INSP of the target main basic block BB_ciP then follow the instruction INSC1.

Provision is then made to insert, for example, upstream of the processor PR or inside the processor upstream of the arithmetic and logic unit, a processing module MT, which may take the form of software and/or hardware, which replaces the operation code OPCL with a specific operation code OPC1 corresponding to a non-operation (NOP), so as to cause this new instruction INSC2 to be delivered to the processor PR, which will therefore not perform any operation. Of course this processing module MT is configured so as not to modify the operation codes of the other main instructions INSP of the target main basic block which then follow the instruction INSC2.

Figure 9:
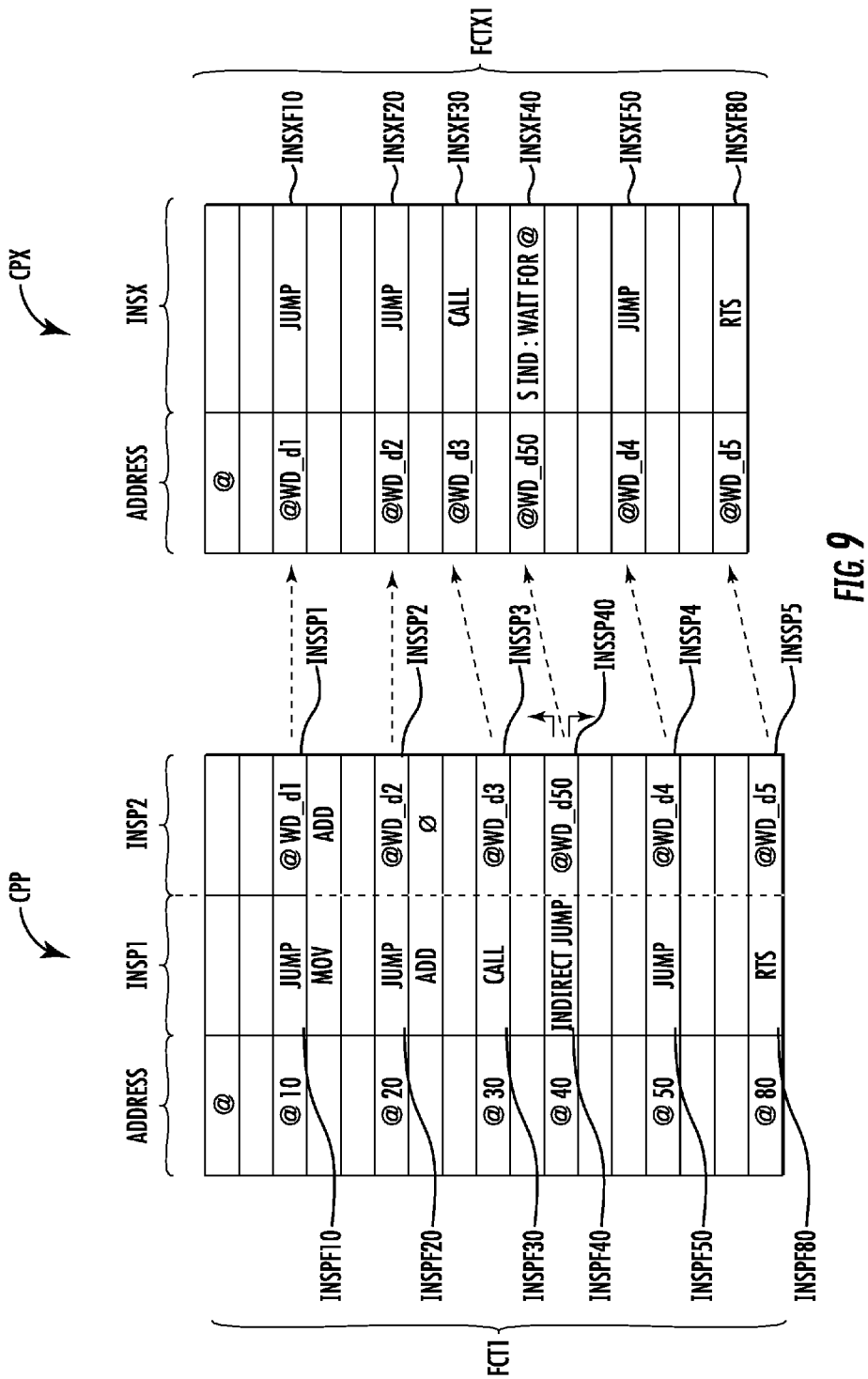

Reference is now made more particularly to FIG. 9 to process non-predictable indirect branches, especially non-predictable indirect jump instructions, but also instructions of indirect function calls.

Figure 10:
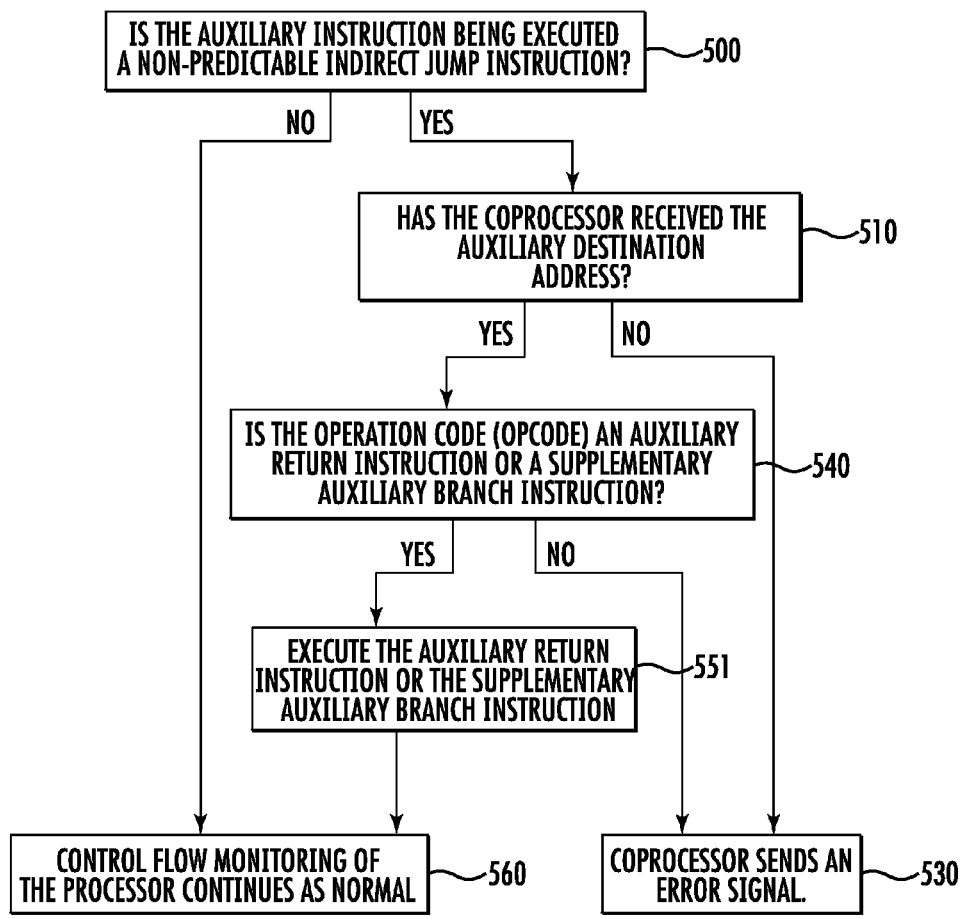

In FIGS. 9 and 10 an example of processing a non-predictable indirect jump instruction is illustrated. In FIG. 9 the architecture is here again an architecture of the "dual issue" type.

By analogy with FIG. 4, the left part of FIG. 9 schematically represents the pairs of instructions INSP1, INSP2 delivered by the main memory MP as well as their address @ in the main memory while the right part of FIG. 9 represents the auxiliary instructions INSX with their address @ in the auxiliary memory.

A program code is generally sliced up into functions comprising in practice a base function and one or more secondary functions (subprograms), each secondary function being able to be called by the base function or by a secondary function.

An indirect jump main instruction INSPF40 is incorporated at the address @40 in a function FCT1 of the main program code CPP. This function can be a main function or else a secondary function. The function FCT1 comprises a main return instruction INSPF80.

Likewise an auxiliary indirect jump instruction INSXF40 is incorporated at the address @WD_d50 in a function FCTX1 of the auxiliary program code CPX which also comprises an auxiliary return instruction INSXF80.

The potential auxiliary branches resulting from the execution of the auxiliary indirect jump instruction INSXF40 and the potential main branches resulting from the execution of the main indirect jump instruction INSPF40 are non-predictable.

Stated otherwise as a function, for example, of the value of a parameter, which is itself dependent on the execution of the main program code, the branches of the instruction INSPF40 can point to any address in the function FCT1.

Hence the generating means MGN are configured to insert at least one synchronization information item intended to be processed by the auxiliary processing unit so as to allow at least one synchronization between the main return instruction INSPF80 and the auxiliary return instruction INSXF80.

This said, the function FCT1 of the main program code can furthermore comprise one or more supplementary main branch instructions INSPF10, INSPF20, INSPF30, INSPF50. These supplementary branch instructions can induce branches of any type, that is to say be, for example, single-target jump instructions, or else predictable multi-target indirect jump instructions, or else indirect jump instructions with non-predictable branches or else call instructions.

Likewise the function FCTX1 of the auxiliary program code comprises supplementary auxiliary branch instructions INSXF10, INSXF20, INSXF30, INSXF50.

The generating means MGN are then configured to insert synchronization information items intended to be processed by the auxiliary processing unit so as to allow synchronizations between the main return instruction and the auxiliary return instruction and between each supplementary main branch instruction and each supplementary auxiliary branch instruction.

Moreover it is also possible for the main indirect jump instruction INSPF40 to branch at a given instant into the current main basic block (that terminating with this main indirect jump instruction INSPF40), for example, between the address @30 and @40.

The generating means MGN are then configured to also insert a synchronization information item intended to be processed by the auxiliary processing unit so as to allow a synchronization between the main indirect jump instruction INSPF40 and the auxiliary indirect jump instruction INSXF40.

The number of synchronization points is thus increased. In a general manner, the generating means are configured to
associate the synchronization information items respectively with the main return instruction, with the main indirect jump instruction and with each supplementary main branch instruction and to make them respectively designate auxiliary destination addresses in the auxiliary program memory at which are respectively stored the auxiliary return instruction, the auxiliary indirect jump instruction and each supplementary auxiliary branch instruction; and configure the auxiliary indirect jump instruction INSXF40 to select, during its execution, the auxiliary branch associated with the auxiliary destination address designated by the synchronization information item delivered by the main memory subsequent to the delivery of the main indirect jump instruction INSPF40.

The supplementary auxiliary branch instructions INSXF10, INSXF20, INSXF30, INSXF50 and the auxiliary return instruction INSXF80 are generated by the generating means MGN and are placed at the auxiliary destination addresses @WD_d1, @WD_d2, @WD_d3, @WD_d4 and @WD_d5 designated by the corresponding synchronization information items.

The auxiliary indirect jump instruction INSXF40 is for its part placed at the auxiliary destination address @WD_d50 designated by the corresponding synchronization information item.

In the example described here, these synchronization information items are contained in suppletive or supplemental main instructions INSSP1-INSSP5 and INSSP40. Each suppletive or supplemental instruction is in fact here the second instruction INSP2 of the pair of instructions containing either the main return instruction INSPF80 or one of the supplementary main branch instructions INSPF10, INSPF20, INSPF30, INSPF50, or the main indirect jump instruction INSPF40.

In this regard, just as the compiler can tag the non-predictable indirect jump instructions since these instructions are labelled, it can tag the return instructions and the supplementary branch instructions, also labelled with different labels. Also, of course, in this example, it is appropriate that the second instruction INSP2 of a pair of instructions containing either the main indirect jump instruction INSPF40 or the main return instruction INSPF80 or one of the supplementary main branch instructions INSPF10, INSPF20, INSPF30, INSPF50, be an empty instruction so that the means for generating the compiler can insert the corresponding suppletive instruction INSSPi thereinto. This is a constraint parameter of the compiler program.

Each suppletive instruction INSSPi comprises a specific operation code (opcode) as well as the auxiliary destination address @WD_di at which the compiler will place the auxiliary return instruction INSXF80 or the corresponding supplementary auxiliary branch instruction INSXF10-INSXF50 or the auxiliary indirect jump instruction INSXF40.

The auxiliary return instruction INSXF80 or the corresponding supplementary auxiliary branch instruction INSXF10-INSXF50 comprises in particular a specific operation code.

In regards to the auxiliary indirect jump instruction INSXF40 generated by the generating means MGN of the compiler, it is assigned a special operation code (opcode) corresponding to a special operation that the auxiliary processing unit needs to do when it processes this operation code, namely a standby to wait for delivery of the synchronization information item delivered by the main memory making it possible to know which supplementary auxiliary branch instruction INSXF10-INSXF50 to jump to or whether it needs to jump to the auxiliary return instruction INSXF80 or whether it is to remain at the address @WD_50.

In the present case, this special operation, referenced "Wait for @" is hard-coded in the coprocessor WD, and the latter, when it subsequently executes the auxiliary indirect jump instruction INSXF40 assigned this special operation code, will wait for the synchronization information item, in this instance the auxiliary destination address @WD_di, encoded in a later set of instructions available on the bus BS1.

It should be noted here that stated otherwise, the auxiliary processor takes account of the suppletive instructions only when it is in the standby mode waiting for a suppletive instruction.

Thus, during the execution of the code, branch instructions may be encountered before the indirect jump instruction is executed, and in this case the auxiliary processor takes no account of the suppletive instructions associated with these branch instructions since it is not then in a standby mode waiting for a suppletive instruction.

Reference is now made more particularly to FIG. 10 to describe an example of managing a non-predictable indirect jump instruction.

If in step 500, the auxiliary instruction currently being executed is not a non-predictable indirect jump instruction of the type, for example, of the instruction INSXF40, then the conventional management for monitoring the control flow of the processor continues in a normal manner (step 560).

If on the other hand the instruction currently being executed is an auxiliary non-predictable indirect jump instruction (for example, the instruction INSXF40), then in accordance with what was described above, the coprocessor WD waits for the auxiliary destination address @WD_di encoded in the instruction INSSPi of the pair of instructions which needs to be available subsequently on the bus BS1 (step 510).

If the cycle delay exceeds a predetermined delay having regard to the size of the basic blocks, and no auxiliary destination address is available, then the coprocessor WD sends an error signal (step 530).

If on the other hand before the expiry of the predetermined delay, a suppletive instruction INSSPi is present in the packet of instructions extracted from the memory MP, then the coprocessor extracts the auxiliary destination address @WD_di from the instruction INSSPi and then jumps to the auxiliary destination address thus designated and then checks the operation code (opcode) of the auxiliary instruction thus reached assumed to be an auxiliary return instruction or a supplementary auxiliary branch instruction (step 540).

If, for example, the operation code is erroneous, the method goes back to step 530, and an error message is sent.

In the converse case, the co-processor WD executes in step 551 the instruction reached (auxiliary return instruction or a supplementary auxiliary branch instruction) and the conventional management for monitoring the control flow of the processor continues in a normal manner (step 560).

Figure 11:
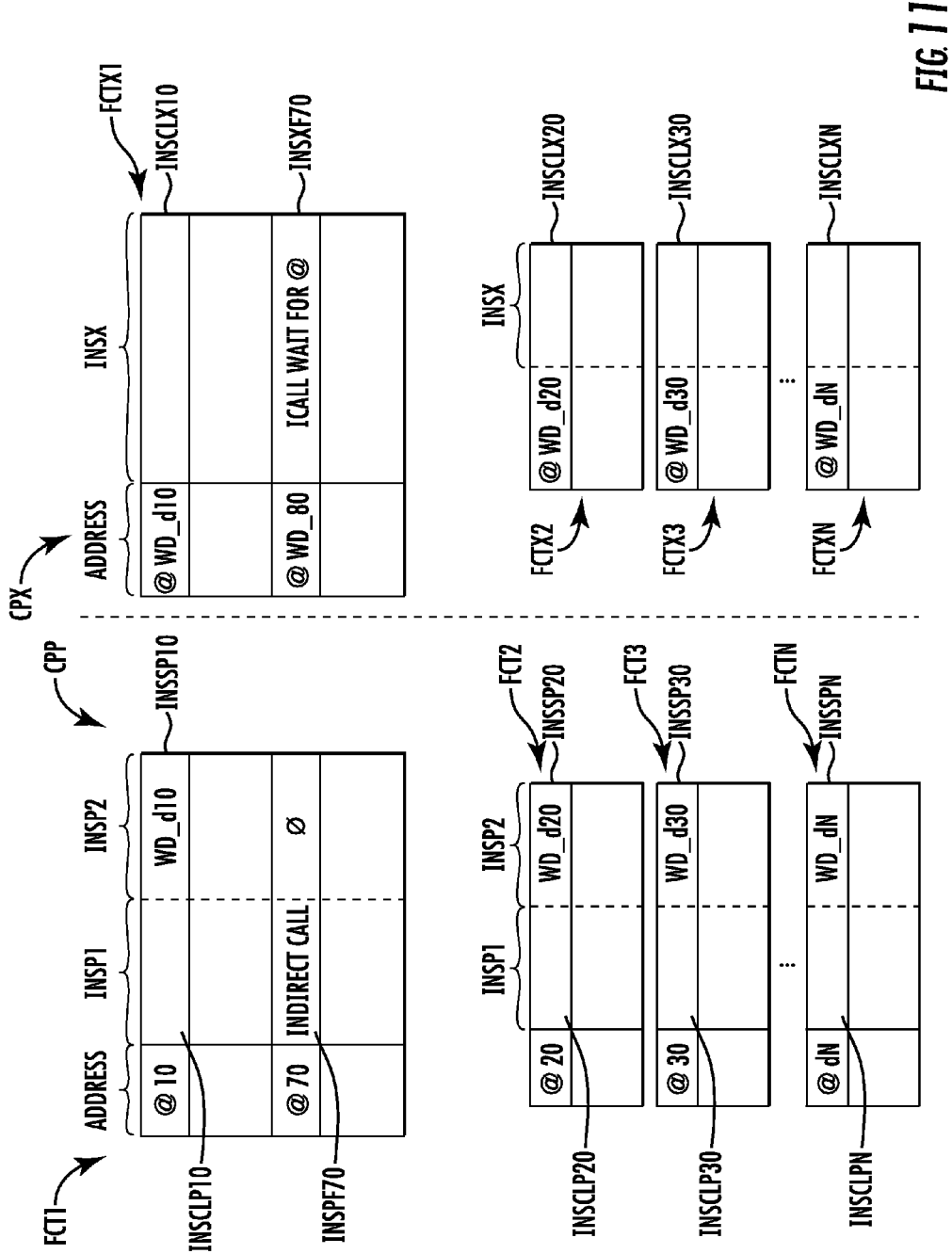
Figure 12:
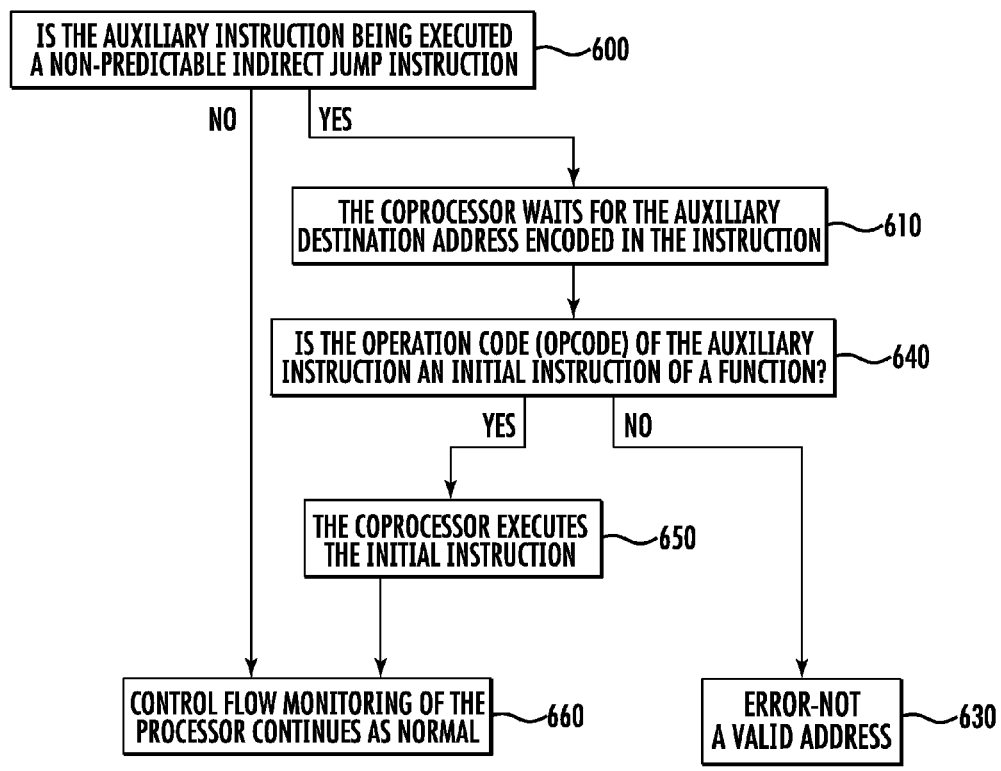

In FIGS. 11 and 12 an example of processing a non-predictable indirect call instruction is illustrated. In FIG. 11 the architecture is here again an architecture of the "dual issue" type.

By analogy with FIG. 4, the left part of FIG. 11 schematically represents the pairs of instructions INSP1, INSP2 delivered by the main memory MP as well as their address @ in the main memory while the right part of FIG. 11 represents the auxiliary instructions INSX with their address @ in the auxiliary memory.

As indicated previously, a program code is generally sliced up into functions comprising in practice a base function and one or more secondary functions (subprograms), each secondary function being able to be called by the base function or by a secondary function.

Moreover a function, which is a base or secondary function, can call itself. A main indirect call instruction INSPF70 is incorporated at the address @70 in a function FCT1 of the main program code CPP. This function can be a main function or else a secondary function.

An auxiliary call instruction INSXF70 is incorporated at the address @WD_80 in a function FCTX1 of the auxiliary program code CPX.

The main program code comprises several other functions FCT2-FCTN and the auxiliary program code comprises several other functions FCTX2-FCTXN.

The generating means MGN are configured to insert synchronization information items intended to be processed by the auxiliary processing unit and configured to allow respective synchronizations between the inputs of all the functions FCT1-FCTN of the main program code and the inputs of all the functions FCTX1-FCTXN of the auxiliary program code.

In a general manner, the generating means MGN are configured to associate the synchronization information items respectively with the initial instructions of all the functions of the main program code and make them respectively designate auxiliary destination addresses in the auxiliary program memory at which are respectively stored the initial instructions of all the functions of the auxiliary program code; and configure the at least one auxiliary call instruction INSXF70 to select, during its execution, the auxiliary branch associated with the auxiliary destination address designated by the synchronization information item delivered by the main memory subsequent to the delivery of the main call instruction INSPF70.

The initial auxiliary instructions INSCLX10-INSCLXN of the functions FCTX1-FCTXN are generated by the generating means MGN and are placed at the auxiliary destination addresses @WD_d10, @WD_d20, . . . @WD_dN designated by the corresponding synchronization information items.

In the example described here, these synchronization information items are contained in suppletive main instructions INSSP10-INSSPN. Each suppletive instruction is in fact here the second instruction INSP2 of the pair of initial instructions of a function FCTi of the main program code, the first initial instruction INSCLP10-INSCLPN of this pair being intended for the main processing unit.

In this regard, the compiler can tag the indirect call instructions since these instructions are labelled. Also, of course, in this example, it is appropriate that the second instruction INSP2 of a pair of initial instructions of a function be an empty instruction so that the compiler generating means can insert the corresponding suppletive instruction INSSPi thereinto. This is a constraint parameter of the compiler program.

Each suppletive instruction INSSPi comprises a specific operation code (opcode) as well as the auxiliary destination address @WD_di at which the compiler will place the corresponding initial auxiliary instruction INSCLX10-INSCLXN, that is to say cause the corresponding function FCTXi to start.

The initial auxiliary instruction INSCLXi comprises in particular a specific operation code. As regards the auxiliary indirect call instruction INSXF70 generated by the generating means MGN of the compiler, it is assigned a special operation code corresponding to a special operation that the auxiliary processing unit needs to do when it processes this operation code, namely a standby to wait for delivery of the synchronization information item delivered by the main memory making it possible to know which initial auxiliary instruction INSCLX10-INSCLXN to jump to.

In the present case, this special operation, referenced "Wait for @" is hard-coded in the coprocessor WD, and the latter, when it subsequently executes the auxiliary indirect call instruction INSXF70 assigned this special operation code, will wait for the synchronization information item, in this instance the auxiliary destination address @WD_di, encoded in the next set of instructions available on the bus BS1.

Reference is now made more particularly to FIG. 12 to describe an example of managing a non-predictable indirect call instruction.

If in step 600, the auxiliary instruction currently being executed is not an indirect call instruction of the type, for example, of the instruction INSXF70, then the conventional management for monitoring the control flow of the processor continues in a normal manner (step 660).

If on the other hand the instruction currently being executed is an auxiliary indirect call instruction (for example, the instruction INSXF70), then in accordance with what was described above, the coprocessor WD waits for the auxiliary destination address @WD_di encoded in the instruction INSSPi of the next pair of instructions which will be available subsequently on the bus BS1 (step 610).

If a suppletive instruction INSSPi is present in the packet of instructions extracted from the memory MP, then the coprocessor extracts the auxiliary destination address @WD_di from the instruction INSSPi and then jumps to the auxiliary destination address thus designated and then checks the operation code (opcode) of the auxiliary instruction thus reached assumed to be an initial instruction of a function (step 640).

If, for example, the operation code is erroneous then we go to step 630 while sending an error message. If on the other hand the instruction reached is an initial instruction of a function, the co-processor WD executes this initial instruction in step 650 and the conventional management for monitoring the control flow of the processor continues in a normal manner (step 660).

If the architecture is not of the "dual issue" type, it is possible to use a set of specific instructions having a null semantic value in relation to the processor PR and containing the suppletive instruction used to deliver the target auxiliary address.

This set of specific instructions, and in particular the suppletive instruction, is predefined for the auxiliary processing unit having regard in particular to its hardware architecture.

Figure 13:
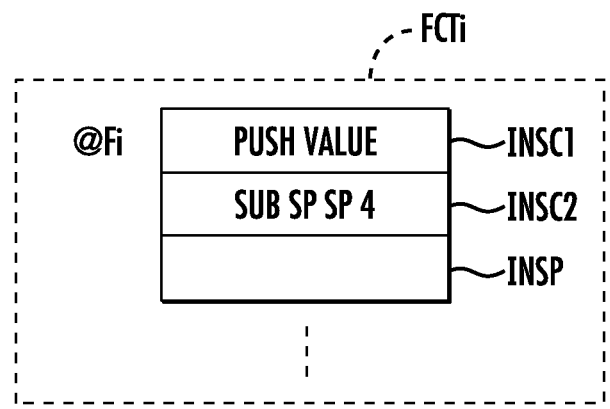

This is the case in the example illustrated in FIG. 13. In this example, the compiler generates in the main program code CPP, at the start of each function FCTi, that is to say at the address @Fi, the suppletive instruction INSC1 containing for example, a "PUSH value" instruction which stacks the value "value" in a stack managed in the sense of increasing addresses, this value "value" being the auxiliary destination address at which the function FCTXi of the auxiliary program code starts.

Next, this instruction INSC1 is followed by an instruction INSC2 of the type "SUB SP SP 4" which makes it possible to erase this value from the stack managed here in the sense of increasing addresses. Therefore, the two instructions INSC1 and INSC2 are transparent to the processor PR.

Figure 14:
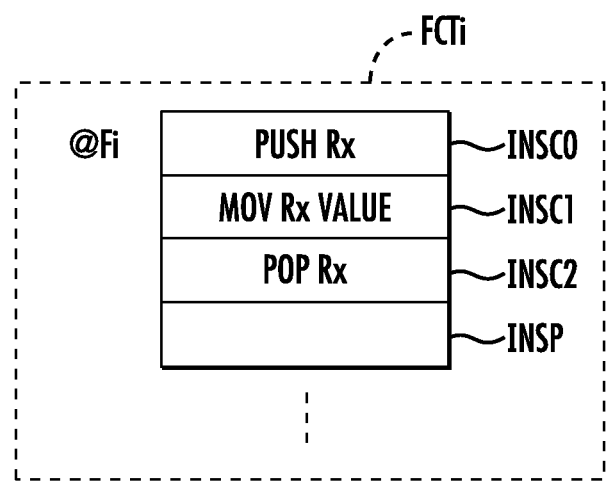

The other main instruction or instructions INSP of the main program code then follow the instruction INSC2. If stacking an immediate value is not possible, a register may then be used and in this case, as illustrated in FIG. 14, its initial value is firstly saved on the stack (memory) by an instruction INSC0, generated by the compiler at the start of each function FCTi, that is to say at the address @Fi, of the "PUSH Rx" type and then this instruction INSC0 is followed with an instruction INSC1 of the "MOV Rx value" type, that is to say an instruction which places the desired value "value" in the register Rx, this desired value being the auxiliary destination address. This instruction of the "MOV Rx value" type is here the predefined suppletive instruction that will be processed by the auxiliary processing unit.

Finally, the instruction INSC1 is followed with an instruction INSC2 of the "POP Rx" type which pops the previously stacked value from the register Rx so as to return to the same state. Here again, this predefined set of three instructions has a null semantics in relation to the processor PR.

Figure 15:
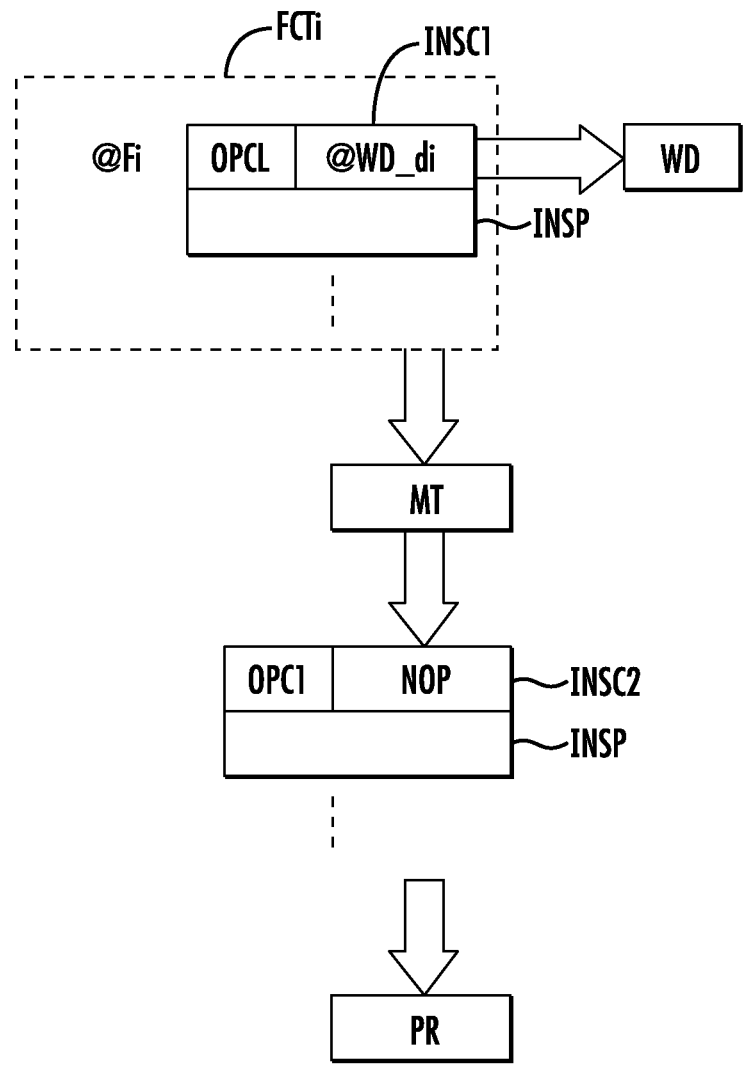

The other main instruction or instructions INSP of the main program code then follow the instruction INSC2. Another possibility is illustrated in FIG. 15.

Still in the case where each memory location of the main memory can store a single instruction, and in the case where there is at least one free operation code (opcode), that is to say not used by the processor PR, the generating means MGN of the compiler can generate, at the start of each function FCTi, that is to say at the address @Fi, a suppletive instruction INSC1 using this free operation code OPCL and containing the synchronization information item @WD_di, which will enable the coprocessor WD to retrieve the corresponding auxiliary destination address.

The other main instruction or instructions INSP of the main program code then follow the instruction INSC1. Provision is then made to insert, for example, upstream of the processor PR or inside the processor upstream of the arithmetic and logic unit, a processing module MT, which may take the form of software and/or hardware, which replaces the operation code OPCL with a specific operation code OPC1 corresponding to a non-operation (NOP), so as to cause this new instruction INSC2 to be delivered to the processor PR, which will therefore not perform any operation. Of course this processing module MT is configured so as not to modify the operation codes of the other main instructions INSP of the main program code which then follow the instruction INSC2.

In the case where the main code possesses at one and the same time instructions whose potential branches resulting from their execution are predictable and instructions whose potential branches resulting from their execution are non-predictable, the various implementations described hereinabove can be envisaged, optionally with at least partial possible combinations that may lead to optimizations.

For example, if a function contains a non-predictable indirect jump and a predictable indirect jump, the complementary instructions related to the predictable indirect jump could also be used as suppletive instructions for the synchronization during the execution of the non-predictable jump in the case where one of these complementary instructions is encountered first.

That which is claimed is:

1. A method for generating a main program code to be executed by a main processing unit, and an auxiliary program code to be executed by an auxiliary processing unit for checking a control flow of the main program code, the method comprising:

generating the main program code comprises generating at least one main indirect branch instruction;

generating the auxiliary program code comprises generating at least one auxiliary indirect branch instruction associated with the at least one main indirect branch instruction; and generating the main program code further comprises inserting synchronization data to be processed by the auxiliary processing unit and configured to allow at least one synchronization between an auxiliary program code part and a main program code part resulting, respectively, from execution of the at least one auxiliary indirect branch instruction and from the execution of the at least one main indirect branch instruction, wherein:

the at least one main indirect branch instruction comprises at least one main indirect jump instruction incorporated in a function of the main program code comprising a main return instruction;

the at least one auxiliary indirect branch instruction comprises at least one auxiliary indirect jump instruction incorporated in a function of the auxiliary program code comprising an auxiliary return instruction;

at least one auxiliary branch resulting from the execution of the at least one auxiliary indirect jump instruction and at least one main branch resulting from the execution of the at least one main indirect jump instruction are non-predictable; and the synchronization data to be processed by the auxiliary processing unit is configured to allow at least one synchronization between the at least one main return instruction and the at least one auxiliary return instruction.

2. The method according to claim 1, wherein at least one auxiliary branch resulting from the execution of the at least one auxiliary indirect branch instruction and at least one main branch resulting from the execution of the at least one main indirect branch instruction are predictable, and generating the main program code further comprises inserting synchronization data to be processed by the auxiliary processing unit and configured to allow synchronization between the at least one auxiliary branch and the at least one main branch.

3. The method according to claim 2, wherein the auxiliary program code is stored in an auxiliary memory, the main program code is stored in a main memory, the at least one main branch comprises a plurality of main branches pointing to a plurality of target main addresses in the main memory, the synchronization data is associated, respectively, with the plurality of target main addresses and designate, respectively, a plurality of target auxiliary addresses in the auxiliary program memory, and the at least one auxiliary branch comprises a plurality of auxiliary branches pointing, respectively, to the plurality of target auxiliary addresses, and the at least one auxiliary indirect branch instruction is configured to select, during its execution, the at least one auxiliary branch associated with the plurality of target auxiliary address designated by the synchronization data delivered by the main memory after the delivery of the at least one main indirect branch instruction.

4. The method according to claim 3, wherein:

generating the main program code comprises generating a plurality of main basic blocks of main instructions, comprising at least a first main basic block terminating in the at least one main indirect branch instruction, and a plurality of target main basic blocks starting, respectively, at one of the target main addresses;

generating the auxiliary program code comprises generating a plurality of auxiliary basic blocks of auxiliary instructions associated with the plurality of main basic blocks, and comprising at least a first auxiliary basic block associated with the first main basic block and terminating in the at least one auxiliary indirect branch instruction, and a plurality of target auxiliary basic blocks starting, respectively, at one of the target auxiliary addresses;

generating the main program code further comprises, for each target main basic block, inserting into the main program code of at least one complementary main instruction containing the synchronization data designating at least one of the corresponding target auxiliary addresses; and the at least one auxiliary indirect branch instruction is configured so that, during execution by the auxiliary processing unit, the auxiliary processing unit waits for the delivery of one of the target auxiliary addresses.

5. The method according to claim 4, wherein each memory location of the main memory has a storage capacity of two instruction words, and the pair of instructions located at a start of each target main basic block comprises a target main instruction of the main program code for the main processing unit, together with the complementary main instruction for the auxiliary processing unit and containing the corresponding target auxiliary address.

6. The method according to claim 4, wherein each memory location of the main memory has a storage capacity of one instruction word, and each target main block starts with a set of instructions containing the at least one complementary main instruction, and configured to provide the corresponding target auxiliary address to the auxiliary processing unit and having, jointly, a null meaning in relation to the main processing unit.

7. The method according to claim 4, wherein each memory location of the main memory has a storage capacity of one instruction word, each main instruction comprises an operation code, and each target main block starts with an additional instruction forming the complementary main instruction containing an operation code corresponding to an operation not used by the main processing unit, for the auxiliary processing unit and containing at least one of the target auxiliary addresses to be provided to the auxiliary processing unit, with the operation code of the additional instruction being replaced by an operation code corresponding to a non-operation before the additional instruction is delivered to the main processing unit.

8. The method according to claim 1, wherein the function of the main program code further comprises at least one supplementary main branch instruction, the function of the auxiliary program code further comprises at least one supplementary auxiliary branch instruction, and generating the main program code comprises inserting synchronization data to be processed by the auxiliary processing unit and configured to allow synchronizations between the main return instruction and the auxiliary return instruction, between the at least one main indirect jump instruction and the at least one auxiliary indirect jump instruction, and between the at least one supplementary main branch instruction and the at least one supplementary auxiliary branch instruction.

9. The method according to claim 8, wherein the auxiliary program code is to be stored in an auxiliary memory, the main program code is to be stored in a main memory, the synchronization data are respectively associated with the main return instruction, with the at least one main indirect jump instruction and with the at least one supplementary main branch instruction and respectively designate auxiliary destination addresses in the auxiliary program memory at which are respectively stored the auxiliary return instruction, the at least one auxiliary indirect jump instruction and the at least one supplementary auxiliary branch instruction, and the at least one auxiliary indirect jump instruction is configured to select, during its execution, the at least one auxiliary branch associated with the auxiliary destination address designated by the synchronization data delivered by the main memory subsequent to the delivery of the at least one main indirect jump instruction.

10. The method according to claim 9, wherein generating the main program code comprises for the main return instruction, the at least one main indirect jump instruction and the at least one supplementary main branch instruction, an inserting into the main program code of at least one supplemental main instruction containing the corresponding synchronization data designating the corresponding auxiliary destination address, and the at least one auxiliary indirect jump instruction is configured to provide, during its execution by the auxiliary processing unit, the auxiliary processing unit to wait for the delivery of one of the auxiliary destination addresses.

11. The method according to claim 10, wherein each memory location of the main memory has a storage capacity of two instruction words, and any pair of instructions comprising either at least one supplementary main branch instruction or at least one main return instruction, or at least one main indirect jump instruction containing the corresponding supplemental main instruction for the auxiliary processing unit and containing the corresponding auxiliary destination address.

12. The method according to claim 1, wherein the at least one main indirect branch instruction comprises a main call instruction incorporated in a function of the main program code, the at least one auxiliary indirect branch instruction comprises an auxiliary call instruction incorporated in a function of the auxiliary program code, the main program code comprises a plurality of other functions and the auxiliary program code comprises a plurality of other functions, and generating the main program code comprises inserting synchronization data to be processed by the auxiliary processing unit and configured to allow respective synchronizations between the inputs of all the functions of the main program code and the inputs of all the functions of the auxiliary program code.

13. The method according to claim 12, wherein the auxiliary program code is stored in an auxiliary memory, the main program code is stored in a main memory, the synchronization information items are respectively associated with the initial instructions of all the functions of the main program code and respectively designate auxiliary destination addresses in the auxiliary program memory at which are respectively stored the initial auxiliary instructions of all the functions of the auxiliary program code, and the at least one auxiliary call instruction is configured to select, during its execution, the at least one auxiliary branch associated with the auxiliary destination address designated by the synchronization data delivered by the main memory subsequent to the delivery of the main call instruction.

14. The method according to claim 13, wherein generating the main program code comprises for each function of the main program code, inserting into the main program code of at least one supplemental main instruction associated with the initial instruction of this function and containing the corresponding synchronization data designating the corresponding auxiliary destination address, and the at least one auxiliary indirect jump instruction is configured to force, during its execution by the auxiliary processing unit, the auxiliary processing unit to wait for delivery of one of the auxiliary destination addresses.

15. The method according to claim 14, wherein each memory location of the main memory has a storage capacity of two instruction words, and the pair of instructions at a start of each function of the main program code comprises a main instruction of the main program code for the main processing unit, and the supplemental main instruction for the auxiliary processing unit and containing the corresponding auxiliary destination address.

16. The method according to claim 14, wherein each memory location of the main memory has a storage capacity of one instruction word, and each function of the main program code starts with a set of instructions containing the at least one supplemental main instruction and configured to provide the auxiliary destination address corresponding to the auxiliary processing unit and together having a null meaning in relation to the main processing unit.

17. The method according to claim 14, wherein each memory location of the main memory has a storage capacity of one instruction word, each main instruction comprises an operation code, and each function of the main program code, starts with an additional instruction forming the supplemental main instruction containing an operation code corresponding to an operation not used by the main processing unit, for the auxiliary processing unit and containing the auxiliary destination address to be provided to the auxiliary processing unit, the operation code of the additional instruction to be replaced with an operation code corresponding to a non-operation before delivery to the main processing unit of the additional instruction.

18. The method according to claim 1, wherein the auxiliary program code is configured to perform a verification with disjoint signatures of the control flow of the main program code.

19. A device, comprising:
a main processing unit;
an auxiliary processing unit; and
a computer-readable storage medium storing a program, the program including instructions for:
generating a main program code to be executed by the main processing unit;
generating an auxiliary program code to be executed by the auxiliary processing unit for checking a control flow of the main program code;
generating at least one main indirect branch instruction, at least one auxiliary indirect branch instruction associated with the at least one main indirect branch instruction; and
inserting synchronization data to be processed by the auxiliary processing unit and configured to allow at least one synchronization between an auxiliary program code part and a main program code part resulting respectively from execution the at least one auxiliary indirect branch instruction and from execution of the at least one main indirect branch instruction, wherein the at least one main indirect branch instruction is a main indirect jump instruction incorporated in a function of the main program code comprising a main return instruction, wherein the at least one auxiliary indirect branch instruction is an auxiliary indirect jump instruction incorporated in a function of the auxiliary program code comprising an auxiliary return instruction, wherein the at least one auxiliary branch resulting from the execution of the at least one auxiliary indirect jump instruction and the at least one main branch resulting from the execution of the at least one main indirect jump instruction are non-predictable, and wherein the program further includes instructions for inserting the synchronization data to be processed by the auxiliary processing unit so as to allow at least one synchronization between the at least one main return instruction and the at least one auxiliary return instruction.

20. The device according to claim 19, wherein the at least one auxiliary branch resulting from the execution of the at least one auxiliary indirect branch instruction and the at least one main branch resulting from the execution of the at least one main indirect branch instruction are predictable, and wherein the program further includes instructions for inserting synchronization data to be processed by the auxiliary processing unit and allowing synchronization between the at least one auxiliary branch to arise from the execution of the at least one auxiliary indirect branch instruction and the at least one main branch to arise from the execution of the at least one main indirect branch instruction.

21. The device according to claim 20, wherein the auxiliary program code is to be stored in an auxiliary memory, the main program code is to be stored in a main memory, and wherein the program further includes instructions for:
causing a plurality of main branches to point to a plurality of target main addresses of the main memory;
associating synchronization data, respectively, with the plurality of target main addresses, and making them designate, respectively, a plurality of target auxiliary addresses in the auxiliary program memory;
causing a plurality of auxiliary branches to point, respectively, to the plurality of target auxiliary addresses; and
configuring the at least one auxiliary indirect branch instruction to select, during its execution, one of the plurality of auxiliary branches associated with the target auxiliary address designated by the synchronization data delivered by the main memory subsequent to the delivery of the main indirect branch instruction.

22. The device according to claim 21, wherein the program further includes instructions for:
generating a plurality of main basic blocks of main instructions, comprising at least a first main basic block terminating in the at least one main indirect branch instruction, and a plurality of target main basic blocks starting, respectively, at one of the target main addresses;
generating a plurality of auxiliary basic blocks of auxiliary instructions associated with the plurality of main basic blocks and comprising at least a first auxiliary basic block associated with the first main basic block and terminating in the at least one auxiliary indirect branch instruction, and a plurality of target auxiliary basic blocks starting, respectively, at one of the target auxiliary addresses; and
inserting into the main program code, for each target main basic block, at least one complementary main instruction containing the synchronization information item designating the corresponding target auxiliary address, and to configure the at least one auxiliary indirect branch instruction to force, during its execution by the auxiliary processing unit, the auxiliary processing unit to wait for the delivery of one of the target auxiliary addresses.

23. The device according to claim 22, wherein each memory location of the main memory has a storage capacity of two instruction words, and wherein the program further includes instructions for generating the pair of instructions situated at a start of each target main basic block so that it comprises a target main instruction of the main program code for the main processing unit, together with the at least one complementary main instruction for the auxiliary processing unit and containing at least one of the corresponding target auxiliary addresses.

24. The device according to claim 19, wherein the function of the main program code further comprises at least one supplementary main branch instruction, the function of the auxiliary program code further comprises at least one supplementary auxiliary branch instruction, and wherein the program further includes instructions for inserting synchronization data to be processed by the auxiliary processing unit so as to allow synchronization between the at least one main return instruction and the at least one auxiliary return instruction, between the at least one main indirect jump instruction and the at least one auxiliary indirect jump instruction, and between the at least one supplementary main branch instruction and the at least one supplementary auxiliary branch instruction.

25. The device according to claim 24, wherein the auxiliary program code is to be stored in an auxiliary memory, the main program code is to be stored in a main memory, and wherein the program further includes instructions for:
   associating the synchronization data respectively with the at least one main return instruction, with the at least one main indirect jump instruction and with the at least one supplementary main branch instruction and make them respectively designate auxiliary destination addresses in the auxiliary program memory at which are respectively stored the at least one auxiliary return instruction, the at least one auxiliary indirect jump instruction and the at least one supplementary auxiliary branch instruction; and
   configuring the at least one auxiliary indirect jump instruction to select, during its execution, the auxiliary branch associated with the auxiliary destination address designated by the synchronization data delivered by the main memory subsequent to the delivery of the at least one main indirect jump instruction.

26. The device according to claim 19, wherein the at least one main indirect branch instruction comprises a main indirect call instruction incorporated in a function of the main program code, the at least one auxiliary indirect branch instruction comprises an auxiliary indirect call instruction incorporated in a function of the auxiliary program code, the main program code comprises a plurality of other functions and the auxiliary program code comprises a plurality of other functions, and wherein the program further includes instructions for inserting synchronization data to be processed by the auxiliary processing unit and allowing respective synchronizations between the inputs of all the functions of the main program code and the inputs of all the functions of the auxiliary program code.

27. The device according to claim 26, wherein the auxiliary program code is to be stored in an auxiliary memory, the main program code is to be stored in a main memory, and wherein the program further includes instructions for:
   associating the synchronization data respectively with the initial main instructions of all the functions of the main program code and make them respectively designate auxiliary destination addresses in the auxiliary program memory at which are respectively stored the initial auxiliary instructions of all the functions of the auxiliary program code; and
   configuring the at least one auxiliary indirect call instruction to select, during its execution, the auxiliary branch associated with the auxiliary destination address designated by the synchronization data delivered by the main memory subsequent to the delivery of the main indirect call instruction.

28. The device according to claim 27, wherein the program further includes instructions for:
   inserting into the main program code, for each function of the main program code, at least one supplemental main instruction associated with the initial main instruction of this function and containing the corresponding synchronization information item designating the corresponding auxiliary destination address; and
   configuring the at least one auxiliary indirect call instruction to force, during its execution by the auxiliary processing unit, the auxiliary processing unit to wait for the delivery of one of the auxiliary destination addresses.

29. A computing system comprising:
   a main processing unit;
   an auxiliary processing unit;
   a main memory coupled to said main processing unit and said auxiliary processing unit and comprising a main program code stored therein, with the main program code comprising at least one main indirect branch instruction;
   an auxiliary memory coupled to said auxiliary processing unit and comprising an auxiliary program code stored therein, with the auxiliary program code comprising at least one auxiliary indirect branch instruction associated with the at least one main indirect branch instruction; and
   the main program code further comprising synchronization data to be processed by said auxiliary processing unit, and which is configured to allow at least one synchronization between an auxiliary program code part and a main program code part resulting respectively from execution of the at least one auxiliary indirect branch instruction and of the execution of the at least one main indirect branch instruction, wherein:
      the at least one main indirect branch instruction comprises at least one main indirect jump instruction incorporated in a function of the main program code comprising a main return instruction;
      the at least one auxiliary indirect branch instruction comprises at least one auxiliary indirect jump instruction incorporated in a function of the auxiliary program code comprising an auxiliary return instruction;
      at least one auxiliary branch resulting from the execution of the at least one auxiliary indirect jump instruction and at least one main branch resulting from the execution of the at least one main indirect jump instruction are non-predictable; and
      the synchronization data to be processed by the auxiliary processing unit is configured to allow at least one synchronization between the at least one main return instruction and the at least one auxiliary return instruction.

30. The computing system according to claim 29, wherein at least one auxiliary branch results from the execution of the at least one auxiliary indirect branch instruction, and at least one main branch results from the execution of the at least one main indirect branch instruction are predictable, and the main program code inserts synchronization data to be processed by said auxiliary processing unit and configured to allow synchronizations between the at least one auxiliary branch and the at least one main branch.

31. The computing system according to claim 30, wherein the at least one main branch comprises a plurality of main branches pointing to a plurality of target main addresses in said main memory, the synchronization data is associated, respectively, with the plurality of target main addresses and designate, respectively, a plurality of target auxiliary addresses in said auxiliary program memory, and the at least one auxiliary branch comprises a plurality of auxiliary branches pointing, respectively, to the plurality of target auxiliary addresses, and the at least one auxiliary indirect branch instruction is configured to select, during its execution, the at least one auxiliary branch associated with the plurality of target auxiliary address designated by the synchronization data delivered by said main memory after the delivery of the at least one main indirect branch instruction.

32. The computing system according to claim 31, wherein:

the main program code comprises a plurality of main basic blocks of main instructions, comprising at least a first main basic block terminating in the at least one main indirect branch instruction, and a plurality of target main basic blocks starting, respectively, at one of the target main addresses;

the auxiliary program code comprises generating a plurality of auxiliary basic blocks of auxiliary instructions associated with the plurality of main basic blocks, and comprising at least a first auxiliary basic block associated with the first main basic block and terminating in the at least one auxiliary indirect branch instruction, and a plurality of target auxiliary basic blocks starting, respectively, at one of the target auxiliary addresses;

the main program code further comprises, for each target main basic block, insertion into the main program code of at least one complementary main instruction containing the synchronization data designating at least one of the corresponding target auxiliary addresses; and the at least one auxiliary indirect branch instruction is configured so that, during execution by said auxiliary processing unit, said auxiliary processing unit waits for the delivery of one of the target auxiliary addresses.

* * * * *